(12) United States Patent
Niccum et al.

(10) Patent No.: US 8,618,011 B2
(45) Date of Patent: Dec. 31, 2013

(54) SYSTEMS AND METHODS FOR REGENERATING A SPENT CATALYST

(75) Inventors: Phillip K. Niccum, Houston, TX (US); Alan M. Claude, Houston, TX (US); Robert B. Peterson, Sugar Land, TX (US)

(73) Assignee: Kellogg Brown & Root LLC, Houston, TX (US)

(*) Notice: Subject to any disclaimer, the term of this patent is extended or adjusted under 35 U.S.C. 154(b) by 331 days.

(21) Appl. No.: 12/757,554

(22) Filed: Apr. 9, 2010

(65) Prior Publication Data
US 2011/0251046 A1 Oct. 13, 2011

(51) Int. Cl.
- B01J 38/12 (2006.01)
- B01J 38/30 (2006.01)
- B01J 38/34 (2006.01)
- B01J 38/22 (2006.01)
- B01J 38/26 (2006.01)
- B01J 38/20 (2006.01)

(52) U.S. Cl.
USPC .................. 502/41; 502/38; 502/43; 502/45; 502/47; 502/49

(58) Field of Classification Search
USPC ...................................... 502/20–56
See application file for complete search history.

(56) References Cited

U.S. PATENT DOCUMENTS

| | | | |
|---|---|---|---|
| 3,902,990 A | 9/1975 | Luckenbach | |
| 3,938,960 A | 2/1976 | Glasgow et al. | |
| 3,974,091 A * | 8/1976 | Parker et al. | 502/41 |
| 4,150,090 A | 4/1979 | Murphy et al. | |
| 4,309,309 A | 1/1982 | Blanton, Jr. | |
| 4,313,848 A | 2/1982 | Scott | |
| 4,325,833 A | 4/1982 | Scott | |
| 4,341,623 A * | 7/1982 | Bertolacini et al. | 208/113 |
| 4,419,221 A | 12/1983 | Castagnos, Jr. et al. | |
| 4,514,285 A | 4/1985 | Niccum et al. | |
| 4,789,458 A * | 12/1988 | Haddad et al. | 208/151 |
| 4,812,430 A | 3/1989 | Child | |
| 4,828,680 A | 5/1989 | Green et al. | |
| 4,830,728 A | 5/1989 | Herbst et al. | |
| 4,843,051 A | 6/1989 | Kovacs et al. | |
| 4,851,374 A | 7/1989 | Yan et al. | |
| 4,991,521 A | 2/1991 | Green et al. | |
| 5,006,495 A | 4/1991 | Pappal et al. | |

(Continued)

OTHER PUBLICATIONS

Rik B. Miller, Euse Gbordzoe and Yorklin Yang in "Solutions for Reducing NOx & Particulate Emissions from FCC Regenerators," National Petrochemical & Refiners Association Annual Meeting, Mar. 21-23, 2004, pp. 1-14, San Antonio, TX.

*Primary Examiner* — Jennifer Smith
(74) *Attorney, Agent, or Firm* — Gary M. Machetta

(57) ABSTRACT

Systems and methods for regenerating a spent catalyst are provided. The method can include heating a hydrocarbon and a coke precursor in the presence of catalyst particles to provide a cracked hydrocarbon product and coked catalyst particles. The cracked hydrocarbon product and the coked catalyst particles can be selectively separated to provide a hydrocarbon product and coked catalyst particles. The coked catalyst particles can be mixed with a carrier fluid to provide a mixture. The mixture can be introduced to an upper surface of a dense phase catalyst zone disposed within a regenerator. A gas can be introduced to a lower zone of the dense phase catalyst zone. At least a portion of the carbon deposited on the coked catalyst particles can be combusted to provide a flue gas, heat, and a regenerated catalyst.

29 Claims, 9 Drawing Sheets

(56) References Cited

U.S. PATENT DOCUMENTS

| | | |
|---|---|---|
| 5,077,251 A | 12/1991 | Owen et al. |
| 5,077,252 A | 12/1991 | Owen et al. |
| 5,106,799 A | 4/1992 | Green et al. |
| 5,139,649 A | 8/1992 | Owen et al. |
| 5,156,817 A | 10/1992 | Luckenbach |
| 5,158,919 A | 10/1992 | Haddad et al. |
| 5,198,397 A | 3/1993 | Raterman |
| 5,268,089 A | 12/1993 | Avidan et al. |
| 5,271,905 A | 12/1993 | Owen et al. |
| 5,288,397 A | 2/1994 | Markham et al. |
| 5,372,706 A * | 12/1994 | Buchanan et al. ............ 208/113 |
| 5,451,313 A | 9/1995 | Wegerer et al. |
| 5,597,537 A | 1/1997 | Wegerer et al. |
| 5,635,140 A | 6/1997 | Miller et al. |
| 5,705,053 A | 1/1998 | Buchanan |
| 5,773,378 A | 6/1998 | Bussey et al. |
| 5,908,804 A | 6/1999 | Menon et al. |
| 6,503,460 B1 | 1/2003 | Miller et al. |
| 6,579,820 B2 | 6/2003 | Tamhankar et al. |
| 6,881,390 B2 | 4/2005 | Yaluris et al. |
| 7,011,740 B2 | 3/2006 | Tallmann et al. |
| 7,153,479 B2 | 12/2006 | Peterson et al. |
| 7,304,011 B2 | 12/2007 | Yaluris et al. |
| 7,368,090 B2 | 5/2008 | Myers et al. |
| 7,491,315 B2 | 2/2009 | Eng et al. |
| 2003/0075480 A1 | 4/2003 | Bartholic |
| 2004/0055934 A1 | 3/2004 | Tromeur et al. |
| 2007/0295647 A1 | 12/2007 | Brownscombe et al. |
| 2008/0152549 A1 | 6/2008 | Towler et al. |
| 2008/0152562 A1 | 6/2008 | Mehlberg et al. |
| 2008/0152566 A1 | 6/2008 | Gauthier et al. |
| 2008/0223754 A1 | 9/2008 | Subramanian et al. |
| 2009/0134059 A1 | 5/2009 | Myers et al. |
| 2009/0288985 A1 | 11/2009 | Long et al. |

\* cited by examiner

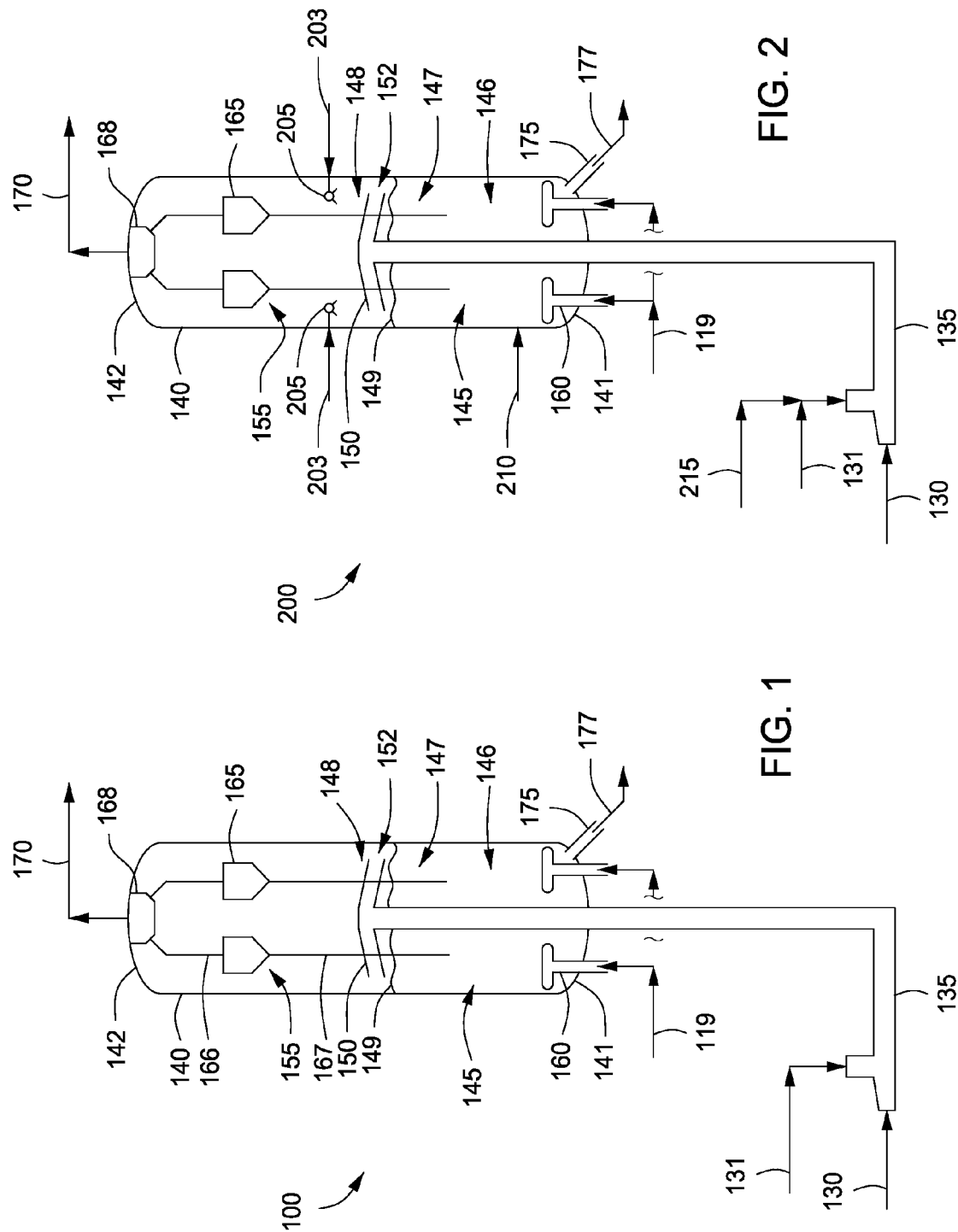

SYSTEMS AND METHODS FOR REGENERATING A SPENT CATALYST

BACKGROUND OF THE INVENTION

1. Field of the Invention

Embodiments of the present invention generally relate to systems and methods for processing hydrocarbons. More particularly, embodiments of the present invention relate to systems and methods for regenerating spent catalyst.

2. Description of the Related Art

Fluid catalytic crackers ("FCC") are a mainstay in the conversion of raw hydrocarbons into one or more products. An FCC consists of few components: one or more riser reactors, one or more disengagers, and one or more regenerators. A hydrocarbon feed and one or more catalysts are introduced to the riser reactor which is maintained at an elevated temperature and/or pressure. The cracking of the hydrocarbons within the riser reactor produces one or more cracked hydrocarbons and small quantities carbonaceous coke which is deposited on the surface of the catalyst. The coke includes mostly carbon, but also contains hydrogen, sulfur, nitrogen, and trace amounts of other elements. These coke deposits reduce the catalyst activity after passage through the riser reactor. The cracked hydrocarbons and the coked catalyst or ("spent catalyst") exit the riser reactor and are introduced to one or more disengagers where the spent catalyst is separated from the cracked hydrocarbons. The cracked hydrocarbons are removed from the FCC for further processing and/or treatment. The spent catalyst is introduced to one or more regenerators where the coke is combusted, oxidized, and/or converted to one or more waste gases.

The combustion process removes coke from the surface of the catalyst, regenerating the catalyst, and permitting its recycle back to the riser reactor. However, the combustion process generates undesirable byproducts, such as nitrogen oxides ("NOx"), which must be removed or at least partially reduced to meet environmental regulations.

There is a need, therefore, for improved systems and methods for regenerating catalyst while producing less undesirable byproducts.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 depicts a partial cross-sectional view of an illustrative catalyst regeneration system having a spent catalyst distributor disposed above a dense phase catalyst bed, according to one or more embodiments described.

FIG. 2 depicts a partial cross-sectional view of an illustrative catalyst regeneration system having a spent catalyst distributor and fluid introduction nozzles disposed above the dense phase catalyst bed, according to one or more embodiments described.

DETAILED DESCRIPTION

Figure 3:
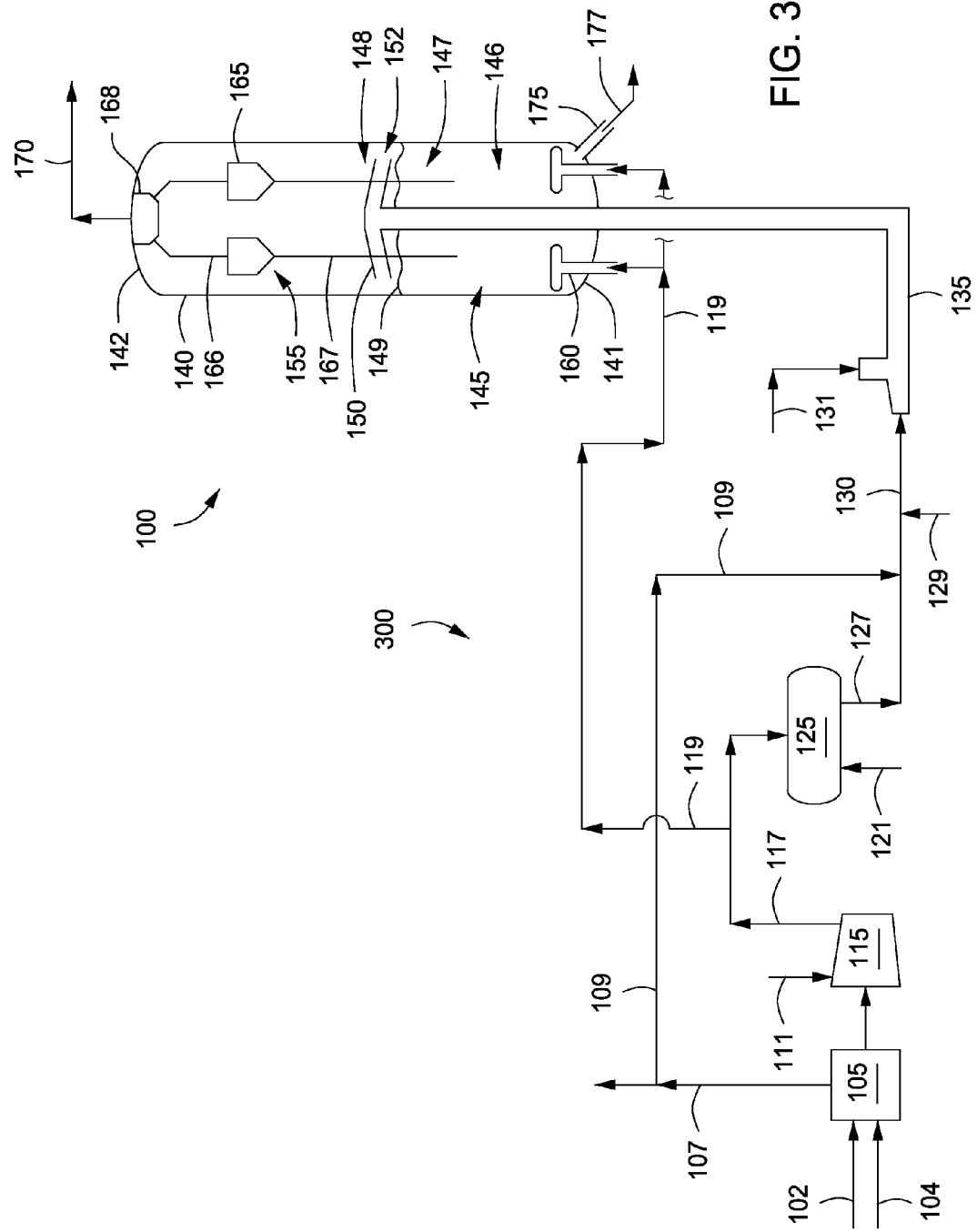
FIG. 3 depicts a partial cross-sectional view of the illustrative catalyst regeneration system depicted in FIG. 1, further including an illustrative variable oxygen content carrier fluid generation system, according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Systems and methods for regenerating a spent catalyst are provided. The method can include heating a hydrocarbon and a coke precursor in the presence of catalyst particles to provide a cracked hydrocarbon product and coked catalyst particles. The cracked hydrocarbon product and the coked catalyst particles can be selectively separated to provide a hydrocarbon product and coked catalyst particles. The coked catalyst particles can be mixed with a carrier fluid to provide a mixture. The mixture can be introduced to an upper surface of a dense phase catalyst zone disposed within a regenerator. A gas can be introduced to a lower zone of the dense phase catalyst zone. At least a portion of the carbon deposited on the coked catalyst particles can be combusted to provide a flue gas, heat, and a regenerated catalyst.

FIG. 1 depicts a partial cross-sectional view of an illustrative catalyst regeneration system 100 having a spent catalyst distributor 150 disposed above a dense phase catalyst bed 145, according to one or more embodiments. The catalyst regeneration system 100 can include one or more regenerators 140. The regenerator 140 can include the dense phase catalyst zone 145, a dilute phase catalyst zone 155, one or more distributors 150, one or more fluid introduction nozzles (two are shown 160), and one or more cyclones (two are shown 165).

The dense phase catalyst zone 145 can be disposed toward a first end 141 of the regenerator 140 and the dilute phase catalyst zone 155 can be disposed toward a second end 142 of the regenerator 140. The dilute phase catalyst zone 155 can have a spent catalyst and/or regenerated catalyst concentration ranging from a low of about 0 kg/m$^3$, about 50 kg/m$^3$, or about 100 kg/m$^3$ to a high of about 140 kg/m$^3$, about 160 kg/m$^3$, about 175 kg/m$^3$, or more. The dense phase catalyst zone 145 can have a spent catalyst and/or regenerated catalyst concentration ranging from a low of about 240 kg/m$^3$, about 320 kg/m$^3$, about 375 kg/m$^3$ to a high of about 420 kg/m$^3$, about 475 kg/m$^3$, about 525 kg/m$^3$, or more.

The dense phase catalyst zone 145 can be referred to as having a first or "lower" zone 146, a second or "middle" zone 147, and a third or "upper" zone 148. The regenerator 140, as shown in FIG. 1 and discussed and described herein, is with reference to a vertical, cylindrical, regenerator 140 with the dense phase catalyst zone 145 disposed below the dilute phase catalyst zone 155 and an L/D ratio of greater than 1, however, any orientation or configuration can be used.

The first zone 146 can include the lower portion or region of the dense phase catalyst zone 145. The third zone 148 can include the upper portion or region of the dense phase catalyst zone 145. The third zone 148 can also be referred to as a "transitional zone" that can span a region intermediate the dense phase catalyst zone 145 and the dilute phase catalyst zone 155. The transitional zone 148 can have a fluid bed density intermediate the density of the lower density dilute phase catalyst zone 155 and the higher density first and second catalyst zones 146, 147, respectively. The second zone 147 can include the middle portion or region disposed between the first zone 146 and the third zone 148.

In one or more embodiments, the one or more distributors 150 can be disposed within the transitional zone 148 between the surface 149 of the dense phase catalyst zone 145 and the second end 142 of the regenerator 140. The distributor 150 can include one or more ports or nozzles 152 to provide fluid communication from line 135, through the distributor 150 and to the regenerator 140. In at least one specific embodiment, the distributor 150 or at least the nozzles 152 can be disposed within the dense phase catalyst bed 145. For example, the distributor 150 or at least the nozzles 152 can be disposed within the third zone 148 of the dense phase catalyst zone 145. In another example, the distributor 150 or at least the nozzles 152 can be disposed within the second or middle zone 147.

In one or more embodiments, the fluid introduction nozzles 160 can be disposed within the dense phase catalyst zone 145 toward the first end 141 of the regenerator 140. For example, the fluid introduction nozzles 160 can be disposed within the first zone 146 of the dense phase catalyst zone 145.

A carrier fluid via line 130 and spent catalyst via line 131 can be introduced to line 135 to provide a mixture of spent catalyst and carrier fluid. The spent catalyst can include carbon or coke at least partially disposed thereon and/or therein. The mixture of spent catalyst and carrier fluid via line 135 can be introduced to the distributor 150, which can introduce the mixture to the regenerator 140 via the one or more exit ports or nozzles 152. In one or more embodiments, the distributor 150 can distribute the mixture about the surface 149 of the dense phase catalyst zone 145. In one or more embodiments, the distributor 150 can distribute the mixture above the surface 149 of the dense phase catalyst zone 145. For example, the mixture can be introduced to the dilute phase catalyst zone 155. In one or more embodiments, the distributor 150 can distribute the mixture beneath the surface 149 of the dense phase catalyst zone 145 and within the third zone 148 of the dense phase catalyst zone 145. In one or more embodiments, the distributor 150 can distribute a portion of the mixture above the surface 149 and a portion below the surface 149 of the dense phase catalyst zone 145. In one or more embodiments, the distributor 150 can distribute the mixture to the second or middle zone 147, the third or upper zone 148, the dilute phase catalyst zone 155, or any combination thereof.

The carrier fluid via line 130 can be or include any suitable fluid. Illustrative carrier fluids can include, but are not limited to, air, oxygen-lean gas, oxygen-rich gas, ozone, steam, carbon monoxide ("CO"), carbon dioxide ("$CO_2$"), combustion or exhaust gas, or any combination thereof. As used herein, the term "oxygen-lean" refers to a gas containing less oxygen than air. As used herein, the term "oxygen-rich" refers to a gas containing more oxygen than air.

A fluid or gas via line 119 can be introduced to the fluid introduction nozzles 160. The fluid can provide sufficient velocity or motive force within the dense phase catalyst zone 145 to provide a fluidized catalyst zone. In other words, the dense phase catalyst zone 145 can be a fluidized catalyst zone. The fluid introduced via nozzles 160 can flow through the dense phase catalyst zone 145 toward the second end 142 of the regenerator 140.

The fluid introduced via nozzles 160 can be any suitable fluid or mixture of fluids. For example, the fluid introduced via line 119 to the regenerator 140 can include, but is not limited to, air, oxygen-rich gas, oxygen-lean gas, ozone, CO, $CO_2$, nitrogen, steam, combustion or exhaust gas, or any combination thereof.

When the fluid introduced via nozzles 160 includes an oxidant, the fluid can flow through the dense phase zone 145 and the oxidant present can combust or otherwise burn at least a portion of the carbon or coke deposited on the spent catalyst and/or coke dust to provide a regenerated catalyst via line 177 and a combustion gas or flue gas via line 170. The regeneration, i.e. combustion of the coke deposited on and/or within the catalyst can re-expose the reactive surfaces of the catalyst, thereby regenerating the catalyst and permitting reuse. The flue gas can contain oxygen, CO, $CO_2$, NOx, and/or sulfur oxides ("SOx") among other components. The CO produced during combustion of the spent catalyst can be further oxidized with the oxidant present therein to form $CO_2$.

The amount of oxygen introduced via the carrier fluid in line 130 can range from a low of about 0.5%, about 1%, about 3%, about 5%, or about 10% to a high of about 50%, about 55%, or about 60% of the total amount of oxygen introduced to the regenerator 140 via lines 130 and 119. In another example, the amount of oxygen introduced via the carrier fluid in line 130 can be about 15%, about 20%, or about 25% of the total amount of oxygen introduced via lines 130 and 119 to the regenerator 140. The amount of oxygen introduced via the fluid in line 119 can range from a low of about 40%, about 45%, or about 50% to a high of about 75%, about 85%, about 95%, or about 99.5% of the total amount of oxygen introduced to the regenerator 140 via line 130 and/or line 119. For example, the amount of oxygen introduced via line 119 can be about 75%, about 80%, or about 85% of the total amount of oxygen introduced via lines 130 and 119. The amount of oxygen introduced to the regenerator 140 via lines 119 and 130 can remain constant or can vary. The amount of oxygen introduced to the regenerator 140 via lines 119 and 130 can remain constant or can vary with respect to one another.

The cyclones 165 can separate at least a portion of any entrained catalyst and/or other particulates, such as non-combusted coke particles, in the flue gas to provide a solids-lean flue gas via line 166 and separated catalyst and other particulate matter via line 167. The cyclones 165 can provide catalyst separation efficiency greater than about 90%, about 95%, about 98%, about 99%, about 99.5%, about 99.9%, or about 99.99%. The separated catalyst and/or other particulates can be reintroduced to the dense phase catalyst zone 145 via lines 167. The solids-lean flue gas via line 166 can be introduced to plenum 168. The solids-lean flue gas via lines 166 from multiple cyclones 165 can be mixed within the plenum 168 and recovered as a flue gas via line 170 from the plenum 168.

In one or more embodiments, CO and/or coke afterburning can occur within the dilute phase catalyst zone 155, the cyclones 165, the plenum 168, and/or the flue gas recovery line 170. Afterburning of the CO and/or coke can increase the temperature of the flue gas recovered via line 170. For example, flue gas can enter the cyclones 165 at a temperature of about 670° C. to about to about 695° C. and due to afterburning of CO within the cyclones the flue gas exiting the cyclones 165 can be at a temperature of about 720° C. to about 765° C. However, the heat generated by the exothermic oxidation of the CO and/or coke can be acceptable, such that the flue gas temperature remains within catalyst regeneration system 100 operational limits. For example, the temperature of the flue gas with CO and/or coke afterburning can remain below about 900° C., below about 850° C., below about 800° C., below about 775° C., below about 760° C., or less.

The coke deposited on the spent catalyst introduced via nozzles 152 and/or CO produced during combustion of the coke can reduce the formation of NOx within the regenerator 140. For example, the coke deposited on the spent catalyst can reduce the formation of NOx within the dilute phase catalyst zone 155, thereby reducing the amount of NOx within the flue gas in line 170. Two potential or possible reaction pathways involving the carbon contained in coke on the spent catalyst and CO generated during combustion can include:

$$2NO + C \rightarrow N_2 + CO_2; \quad (1) \text{ and}$$

$$2NO + 2CO \rightarrow N_2 + 2CO_2 \quad (2)$$

The above potential or possible reactions, among others, can provide a flue gas having reduced NOx concentrations, which can be due, at least in part, to the increased amount of CO and/or carbon in the dilute phase catalyst zone 155. In one or more embodiments, the NOx concentration in the flue gas via line 170 can be less than about 150 ppm, less than about 100 ppm, less than about 75 ppm, less than about 50 ppm, less than about 40 ppm, less than about 30 ppm, less than about 20 ppm, about 15 ppm, or less. For example, the NOx concentration in the flue gas can range from about 15 ppm to about 45 ppm, about 15 ppm to about 27 ppm, about 25 ppm to about 40 ppm, or about 30 ppm to about 45 ppm.

The amount of oxidant via line 119 and/or in the carrier fluid via line 130 can range from a low of about 80%, about 85%, or about 90% to a high of about 105%, about 110%, about 115%, or more of the stoichiometric oxygen required to oxidize the total amount of carbon and/or CO introduced and/or produced within the regenerator 140. In one or more embodiments, 100% of the stoichiometric oxygen required for complete combustion and oxidation of the materials introduced to the regenerator 140 can be introduced via line 119 and/or line 130. Excess oxygen ranging from a low of about 0.1%, about 0.5%, or about 1% to a high of about 1.5%, about 2.5%, or about 3.5% more than the stoichiometric oxygen required to oxidize the total amount of carbon and/or CO introduced and/or produced within the regenerator 140 can be introduced via line 119 and/or line 130. Introducing excess oxygen to the regenerator 140 can provide a flue gas via line 170 that contains oxygen ranging from a low of about 0.1% mol, about 0.5% mol, or about 1% mol to a high of about 2% mol, about 3% mol, about 4% mol, or more. In at least one specific embodiment the oxygen content of the flue gas via line 170 can range from about 1.5% mol to about 2.5% mol.

The catalyst or catalyst particles can provide a heat sink within the regenerator 140. In other words, the catalyst particles can provide enough heat absorption to reduce the temperature within the regenerator 140 due to the combustion of coke and/or CO. The catalyst particles can provide enough heat absorption to prevent the temperature within the regenerator 140 from exceeding operational limits.

In one or more embodiments, the catalyst can include, but is not limited to, one or more zeolites, metal impregnated catalysts, faujasite zeolites, modified faujasite zeolites, Y-type zeolites, ultrastable Y-type zeolites (USY), rare earth exchanged Y-type zeolites (REY), rare earth exchanged ultrastable Y-type zeolites (REUSY), rare earth free Z-21, Socony Mobil #5 zeolite (ZSM-5), ZSM-11, ZSM-12, ZSM-23, ZSM-35, ZSM-38, or any other high activity zeolite catalysts.

FIG. 2 depicts a partial cross-sectional view of an illustrative catalyst regeneration system 200 having a spent catalyst distributor 150 and fluid introduction nozzles 205 disposed above a dense phase catalyst bed 145, according to one or more embodiments. The catalyst regeneration system 200 can be similar to the catalyst regeneration system 100 discussed and described above with reference to FIG. 1, and can further include one or more fluid introduction nozzles 205 disposed above the dense phase catalyst bed 145 within the regenerator 140. The catalyst regeneration system 200 can also include one or more CO promoter introduction lines 215 in fluid communication with the spent catalyst in line 131. The nozzles 205 can be disposed above the surface 149 of the dense phase catalyst bed 145. In one or more embodiments, a fluid via lines 203 can be introduced to one or more nozzles 205. The fluid introduced via line 203 can include, but is not limited to, air, oxygen-rich gas, oxygen-lean gas, ozone, CO, $CO_2$, nitrogen, steam, combustion or exhaust gas, or any combination thereof. In one or more embodiments, a fluid introduced via line 203 that includes an oxidant can further oxidize CO and/or coke therein. The amount of oxygen introduced via the fluid in line 203 can range from a low of about 0.5%, about 1%, about 3%, or about 5% to a high of about 20%, about 30%, about 40%, or about 50% of the total amount of oxygen introduced to the regenerator 140 via lines 130, 119, and 203. The amount of oxygen introduced via the carrier fluid in line 130 can range from a low of about 0.5%, about 1%, about 3%, or about 5% to a high of about 20%, about 30%, about 40%, or about 50% of the total amount of oxygen introduced to the regenerator 140 via lines 130, 119, and 203. The amount of oxygen introduced with the fluid via line 119 can range from a low of about 40%, about 45%, or about 50% to a high of about 75%, about 85%, or about 95% of the total amount of oxygen introduced to the regenerator 140 via lines 130, 119, and 203. The amount of oxygen introduced via the carrier fluid in line 130 and the fluid via line 203 can range from a low of about 0.5%, about 1%, about 3%, or about 5% to a high of about 20%, about 40%, about 60%, or about 70% of the total amount of oxygen introduced to the regenerator 140 via lines 130, 119, and 203. For example, the amount of oxygen introduced via lines 130 and 203 can be about 15%, about 20%, about 25%, about 30%, or about 35% of the total amount of oxygen introduced to the regenerator via lines 130, 119, and 203.

The one or more CO oxidation promoters via line 215 can be introduced directly to the mixture in line 135, the carrier fluid in line 130, and/or the spent catalyst in line 131. The CO oxidation promoter can reduce the temperature at which CO combusts within the regenerator 140, thereby converting CO to $CO_2$ at a lower temperature to provide a flue gas via line 170 containing little or no CO. For example, the CO concentration in the flue gas via line 170 can be less than about 2% mol, less than about 1.5% mol, less than about 1% mol. less than about 0.7% mol, less than about 0.5% mol, less than about 0.3% mol, less than about 0.1% mol, or less than about 0.01% mol.

The CO oxidation promoter can include, but is not limited to, platinum, palladium, iridium, rhodium, osmium, ruthenium, and rhenium, oxides thereof, derivatives therefore, or any combination thereof. In one or more embodiments, the CO oxidation promoter can be disposed on a support. Suitable supports can include, but are not limited to, silica, alumina, and silica-alumina. Examples of commercially available alumina supports are available under trade names such as PURALOX, CATAPAL and VERSAL. Examples of commercially available silica-alumina supports are available under trade names such as SIRAL and SIRALOX.

The CO oxidation promoter can be categorized based upon the amount of the CO oxidation promoter present within the regeneration system 200. For example, a low activity level CO oxidation promoter can be referred to as having a concentration of the active ingredient, e.g. platinum, within the regeneration system 200 ranging from greater than zero to a high of about 0.3 ppm. A medium activity level CO promoter can be referred to as having a concentration of the active ingredient, e.g. platinum, within the regeneration system 200 ranging from about 0.3 ppm to about 0.9 ppm. A high activity level CO promoter can be referred to as having a concentration of the active ingredient, e.g. platinum, within the regeneration system 200 ranging from a low of about 0.9 ppm to a high of about 2 ppm. A high activity level CO promoter can be present at a concentration greater than 2 ppm, for example about 2.5 ppm, about 3 ppm, or about 4 ppm.

The presence of a CO oxidation promoter can reduce the temperature at which CO will burn, which can reduce the temperature of the flue gas as more of the CO will burn in the dense phase catalyst zone 145 rather than in the dilute phase catalyst zone 155. The reduction in the CO combustion temperature can prevent or reduce a temperature rise within the regenerator 140 and in particular the dilute phase catalyst zone 155 from exceeding operationally safe limits. The temperature within the regenerator 140 and in particular the dilute phase catalyst zone 155 can be maintained below about 900° C., below about 850° C., below about 800° C., below about 775° C., below about 760° C., or less.

In one or more embodiments, the presence of a CO oxidation promoter can promote the combustion of CO within the dense phase catalyst bed 145. The combustion of at least a portion of the CO within the dense phase catalyst bed 145 can reduce the amount of CO combusted within the dilute phase catalyst bed 155, where a higher temperature is more likely or probable, due to the presence of less catalyst particles and therefore, less heat sink.

In one or more embodiments, fresh or "make-up" catalyst can be added via line 210 to the regenerator 140. The make-up catalyst can be introduced to maintain a predetermined amount of catalyst within the catalyst regeneration system 200. The introduction of make-up catalyst via line 210 can be introduced to the spent catalyst in line 131, the spent catalyst mixture in line 135, the regenerator 140, the regenerated catalyst in line 177 or any other suitable location within the catalyst regeneration system 200.

FIG. 3 depicts a partial cross-sectional view of the illustrative catalyst regeneration system 100 depicted in FIG. 1, further including an illustrative variable oxygen content carrier fluid generation system 300, according to one or more embodiments. The variable oxygen content carrier fluid generation system ("carrier fluid system") 300 can include, but is not limited to, one or more turbines 105, one or more blowers 115, and one or more heaters 125.

The turbine 105 can provide a combustion gas or exhaust gas via line 109. In one or more embodiments, the blower can provide compressed via line 117. The gas introduced to the blower 115 via line 111 can include, but is not limited to, air, oxygen-rich gas, oxygen-lean gas, CO, $CO_2$, or any combination thereof. In one or more embodiments, the combination of the turbine 105, blower 115, and/or heater 125 can be operated to provide a carrier gas via line 130 ranging from an oxygen-lean gas to an oxygen-rich gas via line 130 having a predetermined temperature, pressure, and velocity. The turbine 105, blower 115, and/or heater 125 can be replaced with any system suitable for providing a carrier gas via line 109 ranging from an oxygen-lean gas to an oxygen-rich gas. In one or more embodiments, steam via line 129 can be introduced to the combustion gas 109, the compressed gas in line 127, or a mixture thereof to provide a carrier gas via line 130 that includes steam. In one example, steam via line 129 can be introduced as the carrier fluid via line 130. As illustrated, the fluid in line 119 can be provided by the blower 115. Although not shown, the fluid in line 119 can be pre-heated prior to introduction to the regenerator 140 via the nozzles 160.

The turbine 105 can be any turbine suitable for generating power. For example, the turbine 105 can be a gas turbine in which a fuel and an oxidant can be combusted in a combustor and compressed upstream of the turbine. The compressed combusted gas can then be introduced to the gas turbine to generate power in one or more generators (not shown) and to provide a hot gas or exhaust gas via line 107. Another suitable type of turbine can be a combustion turbine where the combustion of the fuel can be integrated within the turbine (i.e. the combustion of the fuel occurs within the turbine). The fuel can be any suitable fuel, such as syngas, hydrogen, methane, other combustible fuel, or mixtures thereof. In one or more embodiments, a fuel via line 102 and an oxidant via line 104 can be introduced to the turbine 105 which can be combusted to provide the exhaust gas via line 107 and power to drive the blower 115.

The blower 115 can be any blower suitable for providing a compressed gas via line 117. In at least one specific embodiment, the blower 115 can be independently driven, i.e. the blower can be powered by equipment other than the turbine 105.

The heater 125 can include any system, device, or combination of systems and/or devices suitable for heating a fluid. In one or more embodiments, the fluid via line 117 can be indirectly heated within the heater 125. In one or more embodiments, the fluid via line 117 can be directly heated within the heater 125, for example by mixing with the combustion products provided by the combustion of a fuel introduced via line 121.

In one or more embodiments, other equipment that can be used to provide a variable oxygen content carrier fluid can include, but is not limited to, one or more air separation units, which can provide an oxygen-rich gas, other combustion systems, or the like. The air separation unit can include cryogenic distillation, pressure swing adsorption, membrane separation, or any combination thereof.

Figure 4:
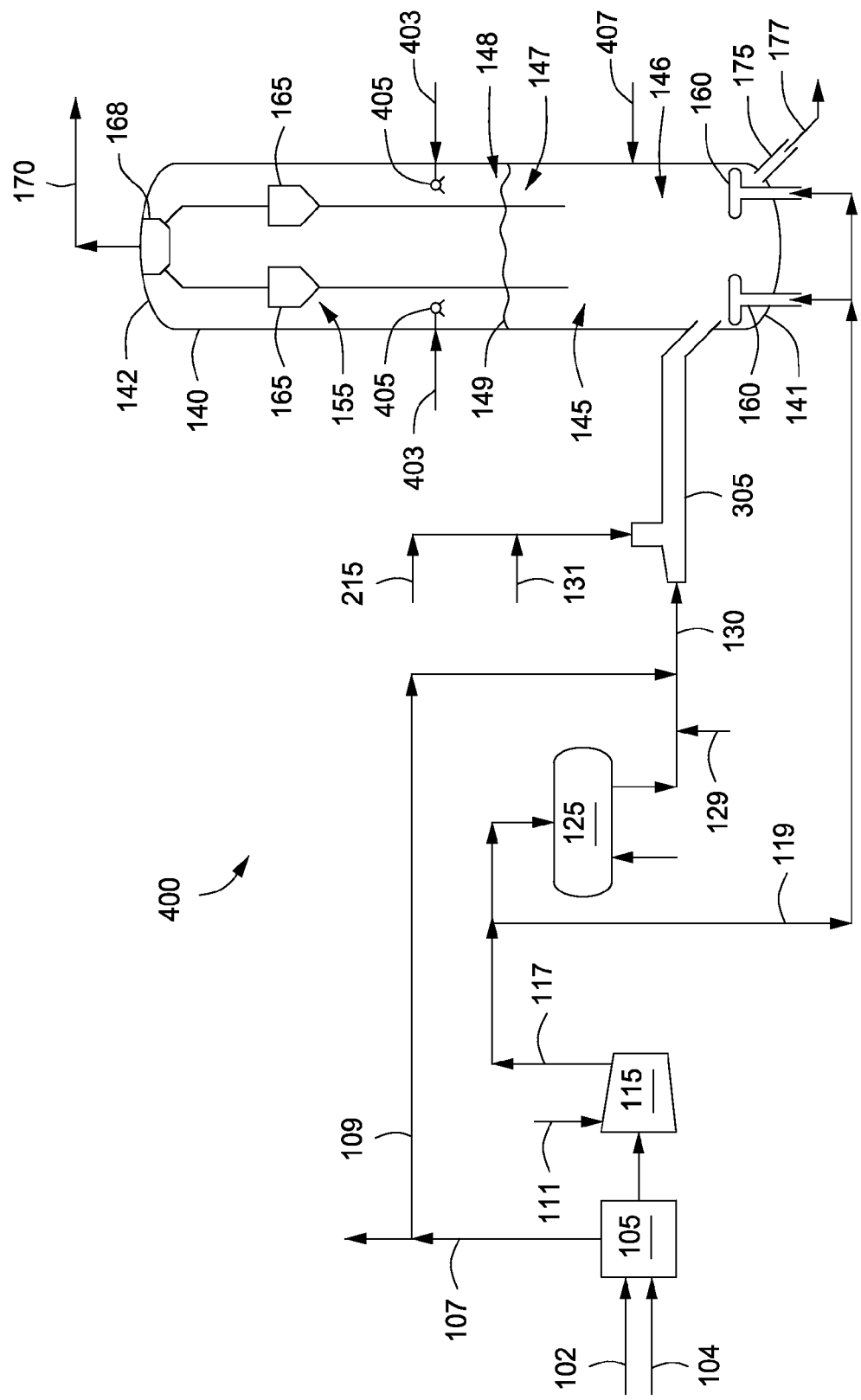
FIG. 4 depicts a partial cross-sectional view of an illustrative catalyst regeneration system having a spent catalyst introduction line in fluid communication with a dense phase catalyst bed and one or more fluid introduction nozzles disposed above the dense phase catalyst bed, according to one or more embodiments described.

FIG. 4 depicts a partial cross-sectional view of an illustrative catalyst regeneration system 400 having a spent catalyst introduction line in 305 fluid communication with a dense phase catalyst bed 145 and one or more fluid introduction nozzles 405 disposed above the dense phase catalyst bed 145, according to one or more embodiments. Referring to both FIGS. 3 and 4, the catalyst regeneration systems 300, 400 can include one or more regenerators 140, one or more turbines 105, one or more blowers 115, and/or one or more heaters 125, which can be the same as those discussed and described above with reference to FIG. 1. Similar as discussed and described above with reference to FIG. 1, the regenerator 140 can include a dense phase catalyst zone 145, a dilute phase catalyst zone 155, one or more fluid introduction nozzles (two are shown 160), one or more cyclones (two are shown 165), one or more plenums 167, one or more flue gas recovery lines 170, and one or more regenerated catalyst recovery outlets 175. The catalyst regeneration system 400 can further include one or more nozzles 405 disposed above the surface 149 of the dense phase catalyst bed 145.

A carrier fluid via line 130 and spent catalyst via line 131 can be introduced to line 305 to provide a mixture of spent catalyst and carrier fluid. In one or more embodiments, line 305 can be in fluid communication with the dense phase catalyst zone 145. In one or more embodiments, the spent catalyst and carrier fluid via line 305 can be introduced to the first zone 146 of the dense phase catalyst zone 145. In one or more embodiments, the spent catalyst and carrier fluid via line 305 can be introduced to the second zone 147 of the dense phase catalyst zone 145. In one or more embodiments, the spent catalyst and carrier fluid via line 305 can be introduced to the third zone 148 of the dense phase catalyst zone 145. In one or more embodiments, the spent catalyst and carrier fluid via line 305 can be introduced to the first zone 146, the second zone 147, the third zone 148, or any combination thereof. The carrier fluid introduced via line 130 can be any suitable carrier fluid. Similar as discussed and described above with reference to FIG. 1, the carrier fluid in line 130 can include a gas ranging from oxygen-lean to oxygen-rich.

A gas or fluid containing an oxidant, e.g. oxygen gas, introduced via line 119 to the nozzles 160, an oxidant present in the carrier gas introduced via line 130, and/or an oxidant introduced via the nozzles 405 can combust or oxidize the coke deposited on the catalyst introduced via line 131 to provide a flue gas via line 170 and a regenerated catalyst via line 177, as discussed and described above with reference to FIGS. 1-3. The fluid introduced via line 119 to the nozzles 160 can introduce enough fluid velocity within the dense phase catalyst bed 145 to provide a fluidized catalyst bed 145.

A fluid via line 403 can be introduced to the one or more nozzles 405 disposed within the regenerator 140 of the catalyst regeneration system 400. Illustrative fluids can include, but are not limited to, air, oxygen-rich gas, oxygen-lean gas, ozone, steam, CO, $CO_2$, nitrogen, exhaust or combustion gas, or any combination thereof. The catalyst regeneration system 400 can also include a CO oxidation promoter introduction line 215 and/or make-up catalyst introduction line 210, as discussed and described above with reference to FIG. 2.

The amount of oxygen introduced via the fluid in line 403 can range from a low of about 3%, about 5%, about 7%, or about 9% to a high of about 20%, about 30%, about 40%, or about 50% of the total amount of oxygen introduced to the regenerator 140 via lines 130, 119, and 403.

Figure 5:
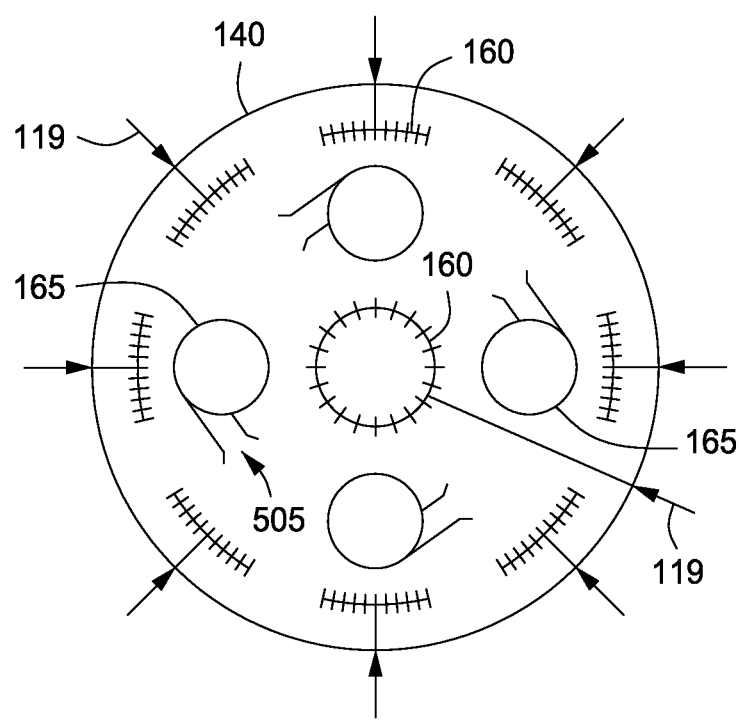
FIG. 5 depicts a partial cross-sectional top view of an illustrative catalyst regenerator, according to one or more embodiments described.

FIG. 5 depicts a partial cross-sectional top view of an illustrative catalyst regenerator 140, according to one or more embodiments. FIG. 5 illustrates one exemplary configuration of the cyclones 165 and fluid introduction nozzles 160 disposed within the regenerator 140. As illustrated in FIG. 5, the distributor 150, lines 135, 210, or 305, and the fluid introduction nozzles 205, which are shown in FIGS. 1, 2, 3, and/or 4, are left out for clarity.

A plurality of fluid introduction nozzles 160 can be distributed about a lower portion of the regenerator 140. As shown, nine fluid introduction nozzles 160 are shown distributed about the regenerator 140. Also shown, are four cyclones 165 disposed within the regenerator 140. Any number of fluid introduction nozzles 160 and any number of cyclones 165 can be disposed within the regenerator 140. The number and particular placement of the fluid introduction nozzles 160 and cyclone 165 can be determined, at least in part, based on the particular catalyst regeneration system 100, 200, 300, and 400 operational requirements.

The flue gas and entrained particulates, such as catalyst particles, can enter the cyclones via cyclone inlet 505. The cyclones can then separate solids or particulates from the flue gas to provide a solids-lean flue gas. The solids-lean flue gas can be recovered via line 170 and the particulates can be returned to the dense phase catalyst zone 145, as discussed and described above with reference to FIGS. 1-4.

Figure 6:
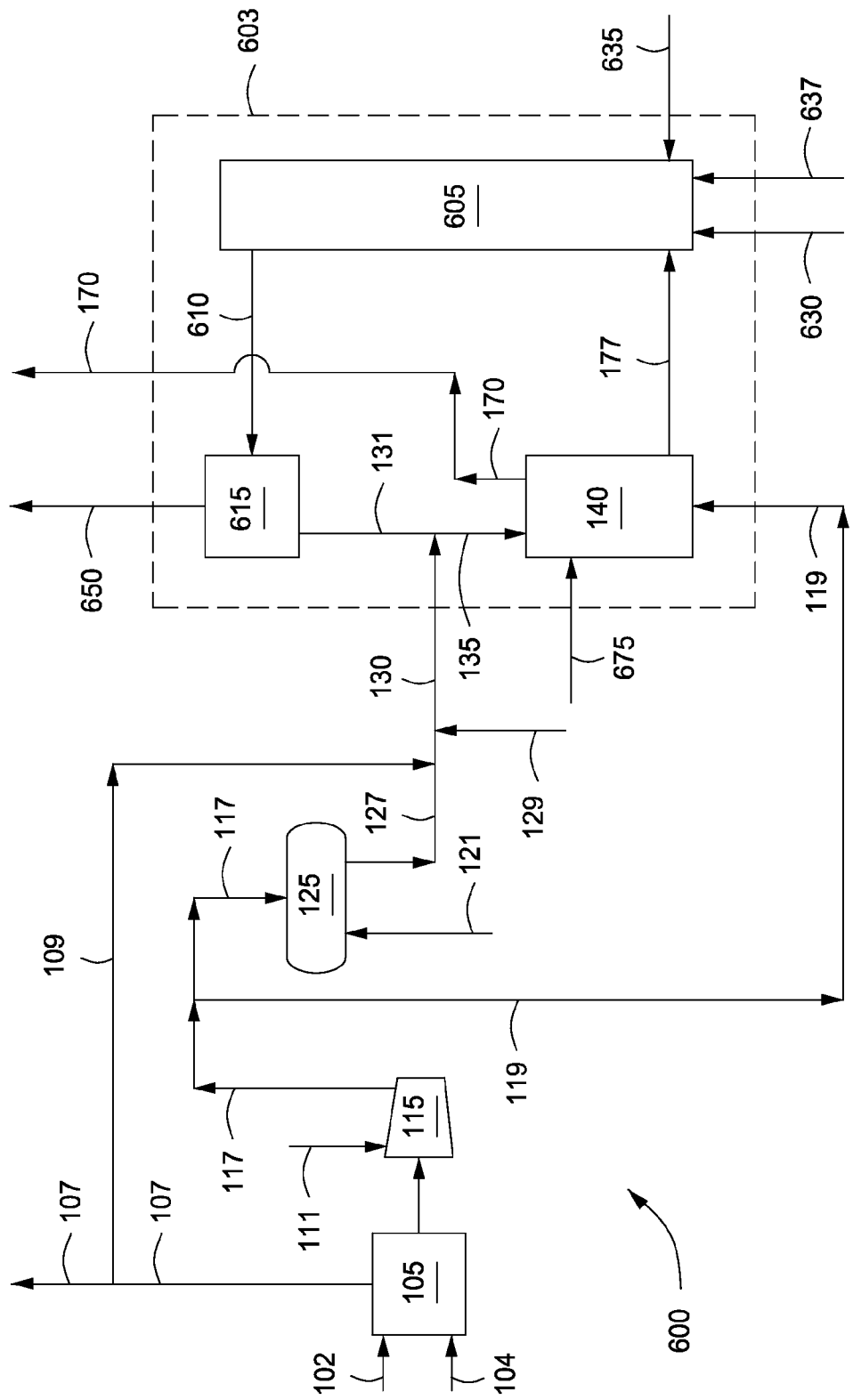
FIG. 6 depicts an illustrative fluid catalytic cracking system according to one or more embodiments described.

FIG. 6 depicts an illustrative fluid catalytic cracking system 600, according to one or more embodiments. The FCC system 600 can include a fluidized catalytic cracker ("FCC") 603 or any other suitable system having one or more risers 605, ducts 610, separation zones 615, and regenerators 140. The regenerator 140 can be similar to the regenerators 140 discussed and described above with reference to FIGS. 1-5. In one or more embodiments, the system 600 can further include a gas turbine 105, a blower 115, and an air heaters 125, which can be similar as discussed and described above with reference to FIGS. 1-4. In one or more embodiments, steam via line 630, one or more hydrocarbons via line 635, one or more coke precursors via line 637, and one or more catalysts via line 177 can be introduced to the one or more risers 605, forming a fluidized mixture ("reaction mixture") therein. The steam via line 630, hydrocarbon via line 635, the coke precursor via line 637, and the catalyst via line 177 can be fed separately to the riser 605 as shown in FIG. 6, or the steam, the hydrocarbon, the coke precursor, and/or the catalyst can be mixed together and fed together as a mixture to the riser 605.

In one or more embodiments, the hydrocarbon introduced via line 635 can be a light hydrocarbon, where the light hydrocarbon produces insufficient coke for heat balanced operation, and the coke precursor via line 637 can be present to supply sufficient coke to facilitate heat-balancing within the process or at least to reduce the amount of supplemental fuel required for heat balancing. If a heavy feedstock is used as a coke precursor, some heavy oil can be produced to aid in fines recovery. Although not shown, the coke precursor via line 637 can be introduced directly to the regenerator 140 as a supplemental fuel. For example, the coke precursor via line 637 can be introduced to the dense phase catalyst zone 145, the dilute phase catalyst zone 155, or a combination thereof. Coke precursor introduced to the dense phase catalyst zone 145 can be introduced to the lower zone 146, the middle zone 147, the upper zone 148, the surface 149 of the dense phase catalyst zone, or any combination thereof. In another example, coke precursors can be introduced to the spent catalyst in line 131 prior to mixing the spent catalyst and the carrier fluid in line 135, after mixing the spent catalyst with the carrier fluid, or both.

The hydrocarbon feed in line 635 can include, but is not limited to, olefins, paraffins, naphthas, mixtures thereof, and/or any combination thereof. In one or more embodiments, the hydrocarbon feed can originate from a refinery. For example, the hydrocarbon feed can be a gas mixture resulting from the distillation of crude oil. In one or more embodiments, the hydrocarbon feed can contain hydrocarbon compounds containing less than about 12, less than about 10, less than about 8, or less than about 6 carbon atoms. For example, the hydrocarbon feed in line 635 can include $C_1$ to $C_{12}$ hydrocarbons, $C_1$ to $C_{10}$ hydrocarbons, $C_1$ to $C_8$ hydrocarbons, $C_1$ to $C_6$ hydrocarbons, $C_1$ to $C_4$ hydrocarbons, $C_2$ to $C_4$ hydrocarbons, $C_2$ to $C_6$ hydrocarbons, $C_2$ to $C_8$ hydrocarbons, $C_2$ to $C_{10}$ hydrocarbons, or $C_2$ to $C_{12}$ hydrocarbons. In another example, the hydrocarbon feed in line 635 can include from about 0.1% vol to 5% vol methane; from about 0.1% vol to about 80% vol ethane; from about 0.1% vol to about 80% vol propane. In one or more embodiments, the hydrocarbon feed can include from about 20% vol to about 60% vol $C_3$ and $C_4$ hydrocarbons and from about 20% vol to about 50% vol $C_5$ and heavier hydrocarbons. In one or more embodiments, the hydrocarbon feed can include at least 60% wt $C_2$-$C_{11}$ olefins and paraffins.

The coke precursor in line 637 can be or include any hydrocarbon or other carbon containing material that can form coke, which can deposit on the catalyst particles to produce coked or spent catalyst particles. The coke precursor in line 637 can be a heavy feedstock such as a refinery stream boiling in a temperature range of from about 650° C. to about 750° C. Alternatively, the coke precursor in line 637 can be a refinery stream boiling in a range from about 220° C. to about 645° C. A hydrocarbon fraction boiling at a temperature ranging from about 285° C. to about 645° C. can be referred to as a gas oil boiling range component while a hydrocarbon fraction boiling at a temperature ranging from about 220° C. to about 645° C. can be referred to as a full range gas oil/resid fraction or a long resid fraction.

Hydrocarbon fractions boiling at a temperature of below about 220° C. can be recovered as transportation fuels such as gasoline. Hydrocarbon fractions boiling at a temperature ranging from about 220° C. to about 355° C. can be directed to transportation fuels such as distillate and diesel fuel product pools, or directed to another process for further upgrading to gasoline.

Hydrocarbon fractions boiling at a temperature of greater than about 535° C. can be regarded as residual fractions. Such residual fractions can include higher proportions of components that tend to form coke in the fluid catalytic cracking process. Typical gas oil and long resid fractions can be derived from several refinery process sources including but not limited to a low, medium, or high sulfur crude unit atmospheric and/or vacuum distillation tower, a delayed or fluidized coking process, a catalytic hydrocracking process, and/or a distillate, gas oil, or resid hydrotreating process. Coke precursors in line 637 can be derived as by-products from lubricating oil manufacturing facilities including, but not limited to, a lubricating oil viscosity fractionation units, solvent extraction processes, solvent dewaxing processes, or hydrotreating processes.

Heat in the riser 605 provided by the steam via line 630 and the catalyst via line 170 can vaporize the hydrocarbon feed via line 635 entering the riser via line 605, to provide the reaction mixture therein. Supplemental heat and/or firing can be provided to the one or more risers 605 using waste heat (not shown) provided from the regenerator 140. Within the riser 605, the hydrocarbons within the reaction mixture can be cracked into one or more hydrocarbons and hydrocarbon by-products to provide a first product mixture. In one or more embodiments, at least a portion of the hydrocarbon by-products present in the riser 605 can deposit on the surface of the catalyst particles, forming coked-catalyst particles or spent catalyst. The hydrocarbon by-products that deposit onto the surface of the catalyst particles can also include hydrocarbons provided from the coke precursor introduced via line 637. Thus, the first product mixture exiting the riser 605 can contain coked-catalyst particles suspended in gaseous hydrocarbons, hydrocarbon by-products, carbon dust or particulates, steam, and other inerts.

In one or more embodiments, the amount of coke or carbon deposited on the catalyst particles can range from a low of about 0.05% wt, about 0.1% wt, or about 0.5% wt to a high of about 1% wt, about 1.2% wt, or about 1.4% wt. In one or more embodiments, the amount of coke deposited on the catalyst particles can range from about 0.5% wt to about 1.5% wt, from about 0.7% wt to about 1.3% wt, from about 0.9% wt to about 1.1% wt, from about 0.05% wt to about 0.3% wt, or from about 0.05% wt to about 0.5% wt. In at least one specific embodiment, the amount of coke deposited on the catalyst particles can be about 1% wt. In at least one other specific embodiment, the amount of coke deposited on the catalyst particles can range from about 0.05% wt to about 0.15% wt, about 0.07% wt to about 0.13% wt, about 0.09% wt to about 0.11% wt.

The catalyst-to-hydrocarbon weight ratio can range from about 4:1 to about 20:1; from about 5:1 to about 7:1; from about 10:1 to about 20:1, from about 12:1 to about 18:1, or from about 14:1 to about 16:1. For example, the catalyst-to-hydrocarbon weight ratio can be about 12:1, about 13:1, about 14:1, about 15:1, about 16:1, about 17:1, or about 18:1. The riser 605 can be operated at a temperature ranging from a low of about 475° C., about 490° C., or about 500° C. to a high of about 650° C., about 680° C., about 700° C., or about 720° C. For example, the riser 605 can be operated at a temperature ranging from about 475° C. to about 710° C., from about 610° C. to about 690° C., or from about 620° C. to about 660° C.

The velocity of the reaction mixture flowing through the riser 605 can range from about 3 m/sec to about 27 m/sec, about 6 m/sec to about 25 m/sec, or about 9 m/sec to about 21 m/sec. The residence time of the reaction mixture in the riser 605 can be less than about 20 seconds, less than about 10 seconds, less than about 8 seconds, less than about 4 seconds, or less than about 2 seconds.

Although not shown, two or more risers 605 can be operated together, for example in parallel. Such an arrangement can provide an FCC system 600 that can crack two different types of hydrocarbon feeds. For example a first riser can crack a "light" hydrocarbon feed, such as $C_3$ and $C_4$ hydrocarbons, and a second riser can crack a "heavy" hydrocarbon feed, such as $C_{10}$ to $C_{20}$ hydrocarbons. The products produced from two or more risers 605 can be introduced to the same or different separation zone(s) 615. The coked catalyst particles produced from the two or more risers 605 can be regenerated in one or more regenerators 140. For example, the coked catalyst particles from the two or more risers 605 can be combined and regenerated together within a single regenerator. Such a combination of multiple risers and feeds can reduce or eliminate the need for introducing a coke precursor via line 637. For example, a heavy hydrocarbon introduced to a first riser can deposit sufficient coke on the catalyst particles that will generate enough heat within the regenerator 140 to regenerate coked catalyst particles produced from a second riser 605 that cracked a light hydrocarbon. For example, a first riser 605 can provide coked catalyst particles having about 0.1% wt carbon deposited thereon and a second riser 605 can provide coked catalyst particles having about 1.1% wt deposited thereon. The amount of carbon provided by combining these two coked catalyst particles within a single regenerator 140 can provide sufficient heat to regenerate the coked catalyst particles. Where regeneration of the coked catalyst particles having about 0.1% wt could require the coke precursor via line 637. Or, the combination of the two coked catalyst particle feeds can reduce the amount of coke precursor required via line 637.

The first product mixture can flow, via the duct (or transition line) 610, to the one or more separation zones 615 where the coked-catalyst particles and/or other particulates can be separated from the gaseous hydrocarbons, steam, and inerts. The separation zone 615 can have a larger cross-sectional area than either the riser 605 or the duct 610 to reduce the velocity of the gas, allowing the heavier coked-catalyst particles and/or other particulates to separate from the gaseous hydrocarbons, steam, and inerts. In one or more embodiments, a steam purge (not shown) can be added the separation zone 615 to assist in separating the gaseous hydrocarbons from the coked-catalyst particles, i.e. stripping the gaseous hydrocarbons from the solids.

The gaseous hydrocarbons ("first product") via line 650 can be recovered from the separation zone 615. Although not shown, in one or more embodiments, the first product in line 650 can be further processed, such as by dehydrating or fractionating to provide one or more finished products including, but not limited to, one or more olefins, paraffins, aromatics, mixtures thereof, derivatives thereof, and/or combinations thereof. The solids, i.e. coked-catalyst particles, can free fall through the separation zone discharge 131 toward the regenerator 140.

Within the regenerator 140, the coked-catalyst particles and carrier fluid mixture via line 135 can be combined with the fluid introduced via line 119 to provide the flue gas via line 170 and regenerated catalyst via line 177, as discussed and described above with reference to FIGS. 1-5.

The flue gas in line 170 can be introduced to one or more optional CO boilers (not shown) to remove additional CO. The one or more CO boilers can be any type of CO boiler, which are well-known. The CO boiler can be operated in multiple stages to reduce the flame temperature occurring in any one stage and limit NOx formation in an oxidizing atmosphere. Low NOx burners can also be used to burn the fuel gas (not shown) which may be needed to keep the CO boiler lit.

The cleaned flue gas via line 170 introduced to one or more optional CO boilers can contain very little that will burn. Most or all of the NOx and NOx precursors in the flue gas can be eliminated within the regenerator 140 where most or all the CO in the flue gas can be eliminated as well. The flue gas in line 170 can have a heating value of less than about 7,500 kJ/m³, less than about 3,700 kJ/m³, less than about 2,800 kJ/m³, less than about 1,900 kJ/m³, less than about 950 kJ/m³, or less than about 400 kJ/m³.

In one or more embodiments, ammonia or an ammonia precursor such as urea can be introduced (not shown) to the optional CO boiler (not shown) to reduce NOx emissions even further. These materials can react quickly with NOx and NOx precursors to reduce it to nitrogen. Additional details for conventional FCC processes and flue gas treatment can be found in U.S. Pat. Nos. 5,268,089; 4,514,285; and 5,773,378; which are incorporated by reference herein. FCC processes for converting lighter hydrocarbon feeds, such as $C_3$ and $C_4$ hydrocarbons can be found in U.S. Pat. No. 7,128,827; and U.S. Patent Publication Nos. 2008/0035527 and 2008/0156696; which are incorporated by reference herein.

In one or more embodiments, at least a portion of the flue gas via line 170 and/or flue gas from the one or more optional CO boilers can be vented to the atmosphere and/or sent to a heat recovery unit (not shown) and then vented to the atmosphere, sequestered under ground, or otherwise disposed. The one or more optional CO boilers, if used can reduce the CO content of the flue gas in line 170 by about 5%, about 10%, about 15%, about 20%, about 25%, about 30%, about 35%, about 40%, about 45%, or about 50%. In one or more embodiments, the one or more optional CO boilers can reduce the CO content of the flue gas in line 170 by from about 5% to about 90%; from about 5% to about 75%; from about 5% to about 60%; or from about 5% to about 50%.

Although not shown, in one or more embodiments, a carbon dioxide ($CO_2$) separation unit can be used to remove at least a portion of the $CO_2$ from the flue gas in line 170. In one or more embodiments, $CO_2$ can be removed for sequestration or reuse, e.g., reuse through enhanced oil recovery.

In one or more embodiments, the one or more optional heat recovery units (not shown) can include any device, system or combination of systems and/or devices suitable for transferring heat from a fluid at a higher temperature to a fluid at a lower temperature. In one or more embodiments, the heat recovery unit can include, but is not limited to single or multiple pass heat exchange devices such as shell and tube heat exchangers, plate and frame heat exchangers, spiral heat exchangers, bayonet type heat exchangers, U-tube heat exchangers, and/or any similar system or device.

Within the regenerator 140 a fluidized mixture, containing spent catalyst particles, regenerated catalyst particles, oxidants, carbon monoxide, carbon dioxide, nitrogen oxides, and/or the one or more fluids introduced via line 119 can be combined within the regenerator 140 with one or more optional doping agents introduced via line 675. The dispersal and deposition of the one or more doping agents on the regenerated catalyst can be enhanced by the high temperature and/or turbulence present in the regenerator 140.

In one or more embodiments, the one or more optional doping agents can be mixed with a supplemental fuel, for example natural gas, and introduced to the regenerator 140 via line 675. The use of supplemental fuel can provide additional heat within the regenerator 140, further enhancing the regeneration of the coked-catalyst particles therein. The supplemental fuel via line 675 can be similar to the coke precursor that can be introduced via line 637 to the riser 605.

Turbulence within the regenerator 140 can improve the even dispersion of the one or more doping agents within the fluidized catalyst zone 145, increasing the contact between the one or more doping agents with the reactive surfaces on the regenerated catalyst. In contrast, the one or more doping agents in a traditional, homogeneously doped, catalyst are dispersed within the catalyst particles. Consequently, less doping agent can be used to achieve the same concentration of doping agent on the surface of the regenerated catalyst particle. Also, changing doping agents in response to changing process conditions and/or hydrocarbon feed composition can be more readily achieved since little or no entrained doping agent exists within the catalyst particle, i.e. the interior matrix of the catalyst particle. For example, the doping agent can be changed simply by changing the type and/or composition of the doping agent added to the regenerator 140.

The selection of an appropriate doping agent or additive or blend of two or more doping agents or additives can be based upon the composition of the incoming hydrocarbon feed via line 635, and/or desired gaseous hydrocarbons in the first product exiting the separation zone 615 via line 650. For example, the addition of a class 2 doping agent such as magnesium or barium can preferentially increase the production of ethylene in the first product in line 650. The addition of a class 13 doping agent such as gallium can result in the increased production of aromatic hydrocarbons in the first product in line 650. The addition of class 8, 9, or 10 doping agents such as ruthenium, rhodium or palladium can preferentially increase the production of propylene in the first product in line 650.

Doped catalyst particles and/or regenerated catalyst particles with or without one or more doping agents or additives can be recycled to the one or more risers 605 via line 177. In one or more embodiments, the flow of regenerated catalyst from the regenerator 140 can be controlled using one or more valves (not shown), which can be manually or automatically adjusted or controlled based upon parameters derived from process temperatures, pressures, flows and/or other process conditions. In one or more embodiments, at least 90% wt, at least 95% wt, at least 99% wt, at least 99.99% wt, at least 99.9975% wt, or at least 99.999% wt of the total catalyst and/or doped catalyst originally introduced to the riser 605 via line 177 can be regenerated, optionally doped with one or more doping agents, and recycled back to the riser 605.

The hydrocarbon feed introduced via line 635 can be preheated (not shown) prior to introduction to the riser 605. Although not shown in FIG. 6, a regenerative heat exchanger using waste process heat can be used to pre-heat the hydrocarbon feed. In one or more embodiments, the temperature of the hydrocarbon feed can range from about 370° C. to about 790° C., about 425° C. to about 700° C., or about 480° C. to about 700° C. In one or more embodiments, the pressure of the hydrocarbon feed can range from about 100 kPa to about 3,450 kPa, about 100 kPa to about 2,750 kPa, or about 100 kPa to about 350 kPa.

The hydrocarbon feed introduced via line 635 can be partially or completely vaporized prior to introduction to the one or more risers 605. The hydrocarbon feed can be about 10% vol to about 100% vol; about 20% vol to about 60% vol; about 30% vol to about 60% vol; about 40% vol to about 60% vol; or about 50% vol to about 60% vol vaporized. The hydrocarbon feed can be at least about 70% vol to about 100% vol; about 80% vol to about 100% vol; or about 90% vol to about 100% vol vaporized. The hydrocarbon feed can be a minimum of 80% wt vaporized; 85% wt vaporized; 90% wt vaporized; 95% wt vaporized; or about 99% wt vaporized prior to introduction to the riser 605. Within the riser 605, the pressure and temperature can be adjusted either manually or automatically to compensate for variations in hydrocarbon feed composition and to maximize the yield of preferred hydrocarbons obtained by cracking the hydrocarbon feed in the presence of the one or more doped catalysts.

In one or more embodiments, the steam introduced via line 630 to the one or more risers 605 can be saturated. The pressure of the saturated steam can be a minimum of about 1,000 kPa, about 2,000 kPa, about 4,000 kPa, or about 6,000 kPa. In one or more embodiments, the pressure of the saturated steam can range from about 100 kPa to about 8,300 kPa; about 100 kPa to about 4,000 kPa; or about 100 kPa to about 2,000 kPa.

In one or more embodiments, the steam introduced via line 630 to the one or more risers 605 can be superheated. In one or more embodiments, where superheated steam is used, the pressure of the superheated steam can be a minimum of about 1,000 kPa, about 2,000 kPa, about 4,000 kPa, or about 6,000 kPa. In one or more embodiments, the pressure of the superheated steam can range from about 100 kPa to about 8,300 kPa; about 100 kPa to about 4,000 kPa; or about 100 kPa to about 2,000 kPa. In one or more embodiments, the temperature of the superheated steam can be a minimum of about 200° C., about 230° C., about 260° C., or about 290° C.

The steam can be introduced via line 630 to the riser 605 at a rate proportionate to the hydrocarbon feed rate via line 635. The steam-to-hydrocarbon feed weight ratio can range from about 1:20 to about 50:1; from about 1:20 to about 20:1; or from about 1:10 to about 20:1.

The first product in line 650 can include from about 5% wt to about 30% wt $C_2$; about 5% wt to about 60% wt $C_3$; about 5% wt to about 40% wt $C_4$; about 5% wt to about 50% wt $C_5$, and heavier hydrocarbons. The temperature of the first product in line 650 can range from about 425° C. to about 815° C.; about 450° C. to about 760° C.; or about 480° C. to about 730° C.

Although not shown, the separation zone 615 can be disposed above (not shown) the riser 605. In one or more embodiments, the separation zone 615 can include a separation zone discharge (not shown), which can provide fluid communication between the separation zone 615 and regenerator 140. The separation zone discharge 615 can include one or more valves to manually or automatically adjust or control the flow of spent catalyst to the regenerator 140 based on parameters derived from process temperatures, pressures, flows, and/or other process conditions.

Figure 7:
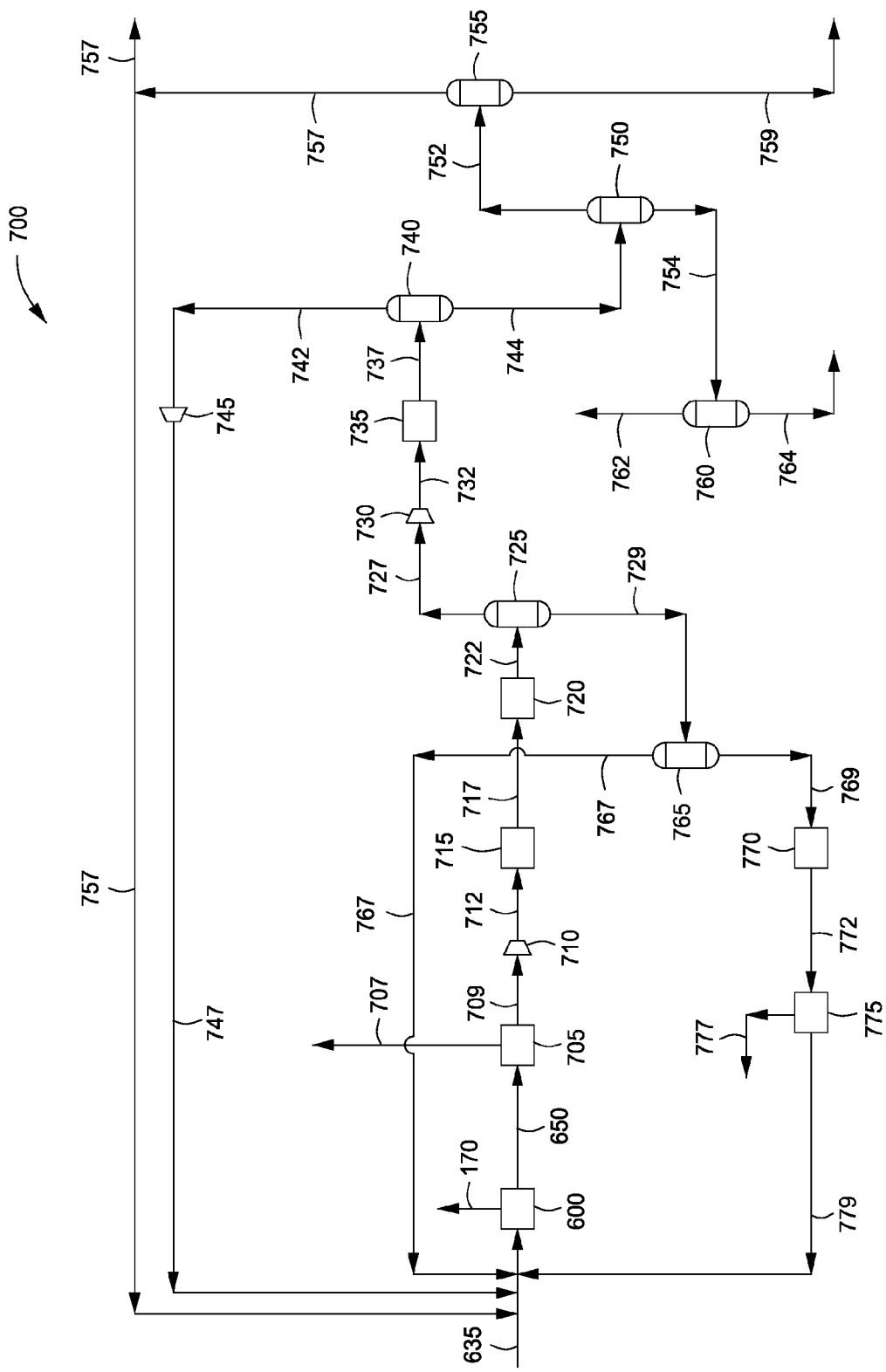
FIG. 7 depicts an illustrative system for producing one or more hydrocarbons, according to one or more embodiments described.

FIG. 7 depicts an illustrative system 700 for producing one or more hydrocarbons, according to one or more embodiments. The feedstock via line 635 can be cracked or selectively separated within one or more FCC systems 600 to provide the first product via line 650, containing naphtha, propylene, ethylene, butane, and other $C_1$ to $C_{10}$ hydrocarbons, mixtures thereof, and/or combinations thereof. The first product in line 650 can be fractionated and/or purified using one or more fractionators 705, treating units 715, drying units 720, and separators 725, 740, 750, 755, 760, and 765 to provide multiple products, including propylene, ethylene, propane, and ethane. One or more products, including methane, ethylene, and heavier $C_4$-$C_6$ hydrocarbons can be internally recycled to the one or more FCC systems 600. In another example, heavier hydrocarbon products can be provided via the one or more fractionators 705, treating units 715, drying units 720, and separators 725, 740, 750, 755, 760, and 765. For example, hydrocarbon products having from about 2 to about 12 carbon atoms can be produced from the system 700.

The first product via line 650 can exit the FCC system 600 at a temperature of about 725° C. to about 680° C., about 750° C. to about 640° C., or about 480° C. to about 595° C. The first product via line 650 can include about 40% wt, 50% wt, or 60% wt $C_2$-$C_{10}$ hydrocarbons. In one or more embodiments, the first product via line 650 can include from about 5% wt to about 10% wt $C_2$, from about 10% wt to about 30% wt $C_3$, from about 10% wt to about 30% wt $C_4$, and from about 40% wt to about 90% wt $C_5$ and heavier hydrocarbons. As discussed and described above in reference to FIGS. 1-6 a regenerator waste gas or flue gas from the FCC system 600 can be recovered via line 170.

The first product via line 650 can be selectively separated using the one or more fractionators 705 to provide a naphthenic mixture via line 707 and an olefinic mixture via line 709. The olefinic mixture can include a major portion of one or more $C_2$-$C_{10}$ olefins and a minor portion of one or more $C_2$-$C_{10}$ paraffins. In one or more embodiments, the naphthenic mixture can include $C_7$-$C_{12}$ hydrocarbons, one or more light naphthas and/or one or more heavy naphthas. For example, the naphthenic mixture can include from about 10% wt to about 40% wt $C_7$, from about 10% wt to about 40% wt $C_8$, from about 5% wt to about 20% wt $C_9$, and from about 5% wt to about 20% wt $C_{10}$-$C_{12}$ hydrocarbons.

The olefinic mixture via line 709 can include about 30% wt, 40% wt, or 50% wt $C_4$-$C_{10}$ olefins. In one or more embodiments, the olefinic mixture can include from about 10% wt to about 50% wt $C_4$, from about 10% wt to about 50% wt $C_5$, from about 5% wt to about 20% wt $C_6$, and from about 5% wt to about 20% wt $C_7$ and heavier hydrocarbons. In one or more embodiments, the pressure of the olefinic mixture exiting the fractionator 705 can range from about 100 kPa to about 1,000 kPa.

The olefinic mixture via line 709 can be compressed using one or more compressors 710 to provide a compressed olefinic mixture via line 712. Compressing the olefinic mixture can facilitate the removal of oxygenates, acid gases, water, or any combination thereof from the hydrocarbons from the compressed olefinic mixture in line 712. The compressed olefinic mixture in line 712 can exit the one or more compressors 710 at a pressure ranging from about 100 kPa to about 5,000 kPa, about 100 kPa to 3,000 kPa, or about 100 kPa to 1,000 kPa. The compressed olefinic mixture can be at a temperature of from about 40° C. to about 300° C.

The compressed olefinic mixture in line 712 can be treated in the one or more treating units 715 to remove oxygenates, acid gases, water, or any combination thereof to provide a treated olefinic mixture via line 717. The treated olefinic mixture via line 717 can include less than about 500 ppmv hydrogen sulfide ("$H_2S$"), less than about 50 ppmv $H_2S$, or less than about 1 ppmv $H_2S$. The treated olefinic mixture can include less than about 500 ppmv $CO_2$; less than about 100 ppmv $CO_2$; or less than about 50 ppmv $CO_2$. The treating unit 715 can include any system or device or combination of systems and/or devices suitable for removing oxygenates, acid gases, water, derivatives thereof, mixtures thereof, which are well known in the art of hydrocarbon refining.

The treated olefinic mixture via line 717 can be dried using one or more drying units 720, providing a dried olefinic mixture via line 722. The dried olefinic mixture in line 722 can include less than 100 ppmv water; less than 10 ppmv water; less than 1 ppmv water, or less than 0.1 ppmv water. The drying unit 720 can include any system or device or combination of systems and/or devices suitable for removing water from a hydrocarbon to provide a dried olefinic mixture via line 722. For example, the drying unit 720 can include systems that use desiccants, solvents, or any combination thereof for removing water from a hydrocarbon.

The dried olefinic mixture via line 722 can be introduced to one or more separators ("de-propanizer") 725 and selectively separated therein to provide an overhead containing $C_3$ and lighter hydrocarbons via line 727, and a bottoms containing $C_4$ and heavier hydrocarbons via line 729. The $C_3$ and lighter hydrocarbons via line 727 can include about 90% wt, 95% wt, or 99% wt $C_3$ and lighter hydrocarbons. The overhead in line 727 can include from about 10% wt up to about 40% wt $C_2$, from about 20% wt up to about 70% wt $C_3$, and from about 0.1% wt to about 1% wt hydrogen. The overhead in line 727 can exit the de-propanizer 725 at pressures ranging from about 500 kPa to about 2,500 kPa. The pressure of the overhead in line 727 can range from about 500 kPa to about 1,000 kPa.

The bottoms in line 729 can include $C_4$ and heavier hydrocarbons. The bottoms in line 729 can include about 90% wt, 95% wt, or 99% wt $C_4$-$C_{10}$. The $C_4$ and heavier hydrocarbons can range from about 30% wt to about 80% wt $C_4$, from about 5% wt to about 30% wt $C_5$, from about 5% wt to about 20% wt $C_6$, and from about 5% wt to about 20% wt $C_7$ and heavier hydrocarbons.

The one or more de-propanizers 725 can include, but are not limited to, a column containing internal components, as well as one or more condensers and/or reboilers. The one or more de-propanizers 725 can include packing media to facilitate the selective separation of $C_3$ and lighter hydrocarbons from the $C_4$ and heavier hydrocarbons. For example, each de-propanizer 725 can include one or more saddles, balls, irregular sheets, tubes, spirals, trays, and/or baffles. The operating pressure of the de-propanizer 725 can range from about 500 kPa to about 2,500 kPa, and the operating temperature of the de-propanizer 725 can range from about −60° C. to about 100° C.

The bottoms via line 729 can be introduced to one or more separators ("gasoline splitters") 765 and selectively separated therein to provide an overhead containing $C_4$-$C_6$ hydrocarbons via line 767, and a bottoms containing $C_7$ and heavier hydrocarbons via line 769. The overhead via line 767 can include butanes and isobutane. For example, the overhead via line 767 can include from about 50% wt to about 95% wt butanes. The overhead via line 767 can include from about 10% wt to about 50% wt isobutane. The overhead via line 767 can include from about 10% wt to about 50% wt $C_4$ olefins, from about 5% wt to about 30% wt $C_5$ olefins, and from about 5% wt to about 20% wt $C_6$ olefins.

In one or more embodiments, all or any portion of the overhead in line 767 can be recycled to the FCC system 600. For example, from about 10% wt to about 100% wt, from about 20% wt to about 100% wt, from about 30% wt to about 100% wt, from about 40% wt to about 100% wt, or from about 45% wt to about 100% wt of the overhead in line 767 can be recycled to the FCC system 600.

The gasoline splitter 765 can include any device, system or combination of devices and/or systems suitable for selectively separating a hydrocarbon mixture to provide the overhead via line 767 containing the $C_4$-$C_6$ hydrocarbons, and the bottoms via line 769 containing the $C_7$ and heavier hydrocarbons. The gasoline splitter 765 can include, but is not limited to, a column containing internal components, as well as one or more condensers and/or reboilers. The gasoline splitter 765 can include packing media to facilitate the selective separation of $C_6$ and lighter hydrocarbons from $C_7$ and heavier hydrocarbons. For example, each gasoline splitter 765 can include saddles, balls, irregular sheets, tubes, spirals, trays, and/or baffles. The operating pressure of the gasoline splitter 765 can range from about 100 kPa to about 2,500 kPa, and temperature can range from about 20° C. to about 400° C.

In one or more embodiments, all or any portion of the $C_7$ and heavier hydrocarbons in line 769 can be introduced to one or more gasoline hydrotreaters 770 and stabilized therein to provide a treated gasoline via line 772. The treated gasoline via line 772 can include a minimum of about 70% wt, 80% wt, or 90% wt $C_6$ and heavier hydrocarbons. The treated gasoline via line 772 can include about 75% wt to about 85% wt $C_6$, about 15% wt to about 25% wt $C_7$, or about 5% wt to about 10% wt $C_8$ and heavier hydrocarbons. The gasoline hydrotreater 770 can include any system or device or combination of systems and/or devices suitable for stabilizing a mixed hydrocarbon. The hydrotreater 770 can include a system that stabilizes gasoline by treating with hydrogen.

All or any portion of the treated gasoline via line 772 can be introduced to one or more BTX units 775 to provide one or more aromatics including, but not limited to, benzene, toluene, xylene, or any combination thereof ("aromatics"), via line 779, and a raffinate via line 777. The aromatics via line 779 can include about 40% wt, 50% wt, 60% wt, 70% wt, or 80% wt BTX. The BTX can include from about 10% wt to about 40% wt benzene, from about 20% wt to about 60% wt toluene, and from about 10% wt to about 40% wt xylene. In one or more embodiments, at least a portion of the aromatics via line 779 can be combined with the hydrocarbon in line 635 and recycled to the FCC system 600. Although not shown in FIG. 7, in one or more embodiments, at least a portion of the aromatics via line 779 can be directly recycled to the FCC system 600. For example, at least about 10% wt, 20% wt, 30% wt, or 40% wt of the aromatics via line 779 can be recycled to the riser 605, either directly or via line 635. In at least one specific embodiment, about 10% wt, 15% wt, or 20% wt of the aromatics via line 779 can be recycled to the riser 605 via line 635 or directly (not shown).

Although not shown, the raffinate via line 777 can be further processed. For example, all or any portion of the raffinate 777 can be directed to a steam pyrolytic cracker (not shown) to recover any olefinic or paraffinic hydrocarbons contained therein.

Returning to the de-propanizer 725, the overhead via line 727 can be compressed using one or more compressors 730 to provide compressed $C_3$ and lighter hydrocarbons via line 732. In one or more embodiments, compressing the $C_3$ and lighter hydrocarbons can facilitate the subsequent separation of the lighter compounds from the $C_3$. The pressure of the compressed $C_3$ and lighter hydrocarbons can range from about 500 kPa to about 3,500 kPa, for example.

The compressed $C_3$ and lighter hydrocarbons via line 732 can be cooled using one or more chill trains 735 to provide chilled $C_3$ and lighter hydrocarbons via line 737. The temperature of the chilled $C_3$ and lighter hydrocarbons in line 737 can range from about −40° C. to about 40° C. The chilled $C_3$ and lighter hydrocarbons in line 737 can have a temperature from about −20° C. to about 5° C.

The chilled $C_3$ and lighter hydrocarbons via line 737 can be selectively separated using one or more separators ("de-methanizers") 740 to provide an overhead via line 742 containing methane, and a bottoms via line 744 containing $C_2$ and $C_3$ hydrocarbons. The overhead via line 742 can include about 70% mol, 80% mol, or 90% mol methane. The bottoms via line 744 can include from about 20% wt to about 50% wt $C_2$ and from about 40% wt to about 80% wt $C_3$ The overhead via line 742 can include about 50% mol to about 95% mol methane. The operating pressure of the de-methanizer 740 can range from about 300 kPa to about 1,000 kPa. The $C_2$ and $C_3$ hydrocarbons via line 744 can include up to about 95% wt $C_2$-$C_3$ or more.

In one or more embodiments, all or any portion of the overhead in line 742 can be compressed using one or more compressors 745 to provide compressed methane via line 747, which can be recycled to the FCC system 600 via line 635. Although not shown in FIG. 7, in one or more embodiments, all or any portion of the compressed methane via line 747 can be recycled directly to FCC system 600. In one or more embodiments, from about 15% vol to about 35% vol, from about 20% vol to 35% vol, from about 25% vol to 35% vol, or from about 30% vol to 35% vol of the compressed methane via line 747 can be recycled to the FCC system 600, either directly or via line 635. The compressed methane exiting the compressor 745 can be at a temperature ranging from about 25° C. to about 200° C.

The bottoms in line 744 can be introduced to one or more separators ("de-ethanizers") 750 and selectively separated therein to provide an overhead containing a $C_2$ hydrocarbon mixture via line 752, and a bottoms containing a $C_3$ hydrocarbon mixture via line 754. The overhead 752 can include about 90% mol, 95% mol, or 99% mol $C_2$ hydrocarbon mixture. The overhead in line 752 can contain from about 5% mol to about 70% mol ethane and from about 30% mol to about 95% mol ethylene. The bottoms in line 754 can include about 90% mol, 95% mol, or 99% mol $C_3$ hydrocarbons. The $C_3$ hydrocarbons in line 754 can include from about 5% mol to about 30% mol propane and from about 70% mol to about 95% mol propylene. The operating pressure of the de-ethanizer 750 can range from about 500 kPa to about 2,500 kPa, and the temperature can range from about −80° C. to about 100° C.

In one or more embodiments, at least a portion of the $C_2$ hydrocarbon mixture in the overhead in line 752 can be introduced to one or more separators ("C2 splitters") 755 and selectively separated therein to provide an ethylene product via line 757 and an ethane product via line 759. The ethane product via line 759 can include about 90% mol, about 95% mol, about 99% mol; or about 99.9% mol ethane. The ethylene product via line 757 can include about 90% mol, about 95% mol, about 99% mol, or about 99.9% mol ethylene.

In one or more embodiments, all or any portion of the ethylene product via line 757 can be recycled to the FCC system 600. Recycling at least a portion of the ethylene product can suppress propylene production in the FCC system 600, thereby increasing the yield of ethylene in the first product via line 650. In one or more embodiments, from about 10% vol to about 60% vol; about 20% vol to about 60% vol; about 30% vol to about 60% vol; about 40% vol to about 60% vol; or about 50% vol to about 60% vol of the ethylene product via line 757 can be recycled to the FCC system 600. In one or more embodiments, from about 60% vol to about 99% vol, from about 70% vol to about 95% vol, or from about 80% vol to about 90% vol of the ethylene product can be recycled to the FCC system 600. In one or more embodiments, at least a portion of the ethylene present in line 757 can be removed as a finished product.

The C2 splitter 755 can be any device, system or combination of devices and/or systems suitable for selectively separating a hydrocarbon mixture to provide the ethylene product via line 757 and the ethane product via line 759. The C2 splitter 755 can include, but is not limited to, a column containing internal components, condensers and/or reboilers. The operating pressure of the C2 splitter 755 can range from about 500 kPa to about 2,500 kPa. The operating temperature of the C2 splitter 755 can range from about −80° C. to about 100° C.

The bottoms via line 754, containing $C_3$ hydrocarbons, can be introduced to one or more C3 splitters 760 and selectively separated therein to provide a propylene product ("second product") via line 762 and a propane product via line 764. The propane product in line 764 can contain about 90% mol, 95% mol, 99% mol, or 99.9% mol propane. The propylene product via line 762 can include from about 60% wt to about 99.9% wt propylene.

The C3 splitter 760 can be any device, system or combination of systems and/or devices suitable for selectively separating the $C_3$ hydrocarbon mixture to provide the propylene product via line 762 and the propane product via line 764. The C3 splitter 760 can include, but is not limited to, a column containing internal components, as well as one or more condensers and/or reboilers. The operating pressure of the C3 splitter 760 can range from about 500 kPa to about 2,500 kPa. In one or more embodiments the operating temperature of the $C_3$ splitter can range from about −100° C. to about 100° C.

Figure 8:
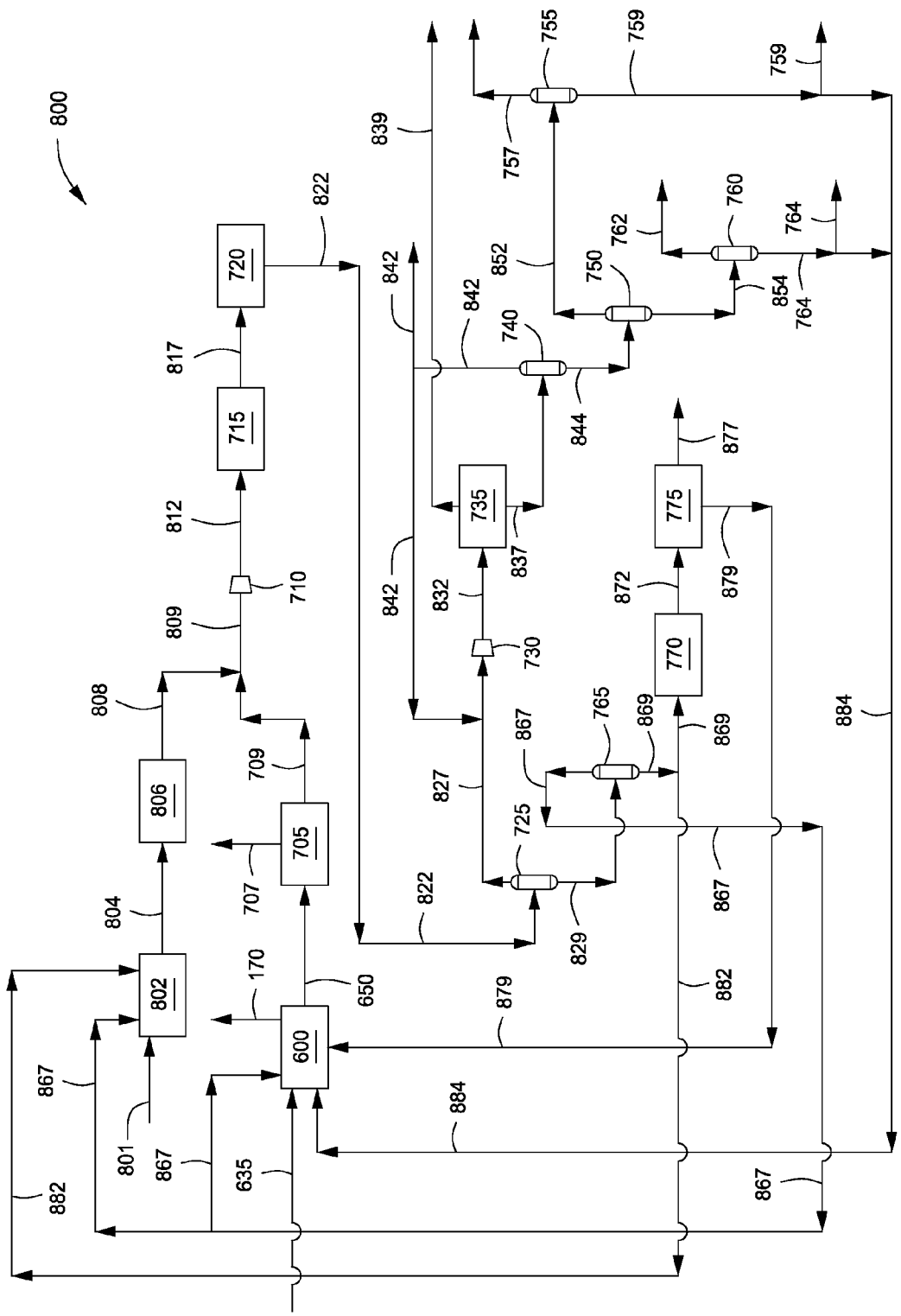
FIG. 8 depicts another illustrative system for producing one or more hydrocarbons, according to one or more embodiments described.

FIG. 8 depicts another illustrative system 800 for producing one or more hydrocarbons, according to one or more embodiments. As depicted, the hydrocarbon via line 635 can be introduced to the FCC system 600 and cracked therein to provide the first product via line 650 and the flue gas via line 170. The first product via line 650 can be introduced to the one or more fractionators 705 to provide the olefinic mixture via line 709 and the naphthenic mixture via line 707. In one or more embodiments, one or more hydrocarbons ("refinery hydrocarbons") can be introduced via line 801 to one or more crackers 802 and cracked therein to provide product via line 804 containing ethylene, propylene, ethane, propane and/or butane. In one or more embodiments the product in line 804 can be introduced to one or more quench columns 806 to provide a quenched product via line 808. The quenched product in line 808 can be combined with the olefinic mixture in line 709 to provide a combined hydrocarbon mixture via line 809.

In one or more embodiments, each cracker 802 can be a fluid catalytic riser type reactor containing one or more risers or cracking zones suitable for cracking and/or selectively separating a refinery hydrocarbon. As used herein, the term "refinery hydrocarbon" refers to gas oils, full range gas oils, resids, derivatives thereof, and/or mixtures thereof. In one or more embodiments, at least two fluid catalytic crackers 802 can operate in parallel or series. The temperature of the riser or cracking zone of the fluid catalytic cracker 802 can range from about 400° C. to about 600° C.

The hydrocarbon mixture via line 809 can be compressed using the one or more compressors 710 to provide a compressed mixture via line 812, which can be treated using the one or more treating units 715 to provide a treated mixture via line 817. The treated mixture can be dried using the one or more drying units 720 to provide a dried mixture via line 822. The dried mixture via line 822 can be introduced to the one or more de-propanizers 725 and selectively separated therein to provide an overhead 827 containing $C_3$ and lighter hydrocarbons and a bottoms 829 containing $C_4$ and heavier hydrocarbons.

The $C_4$ and heavier hydrocarbons via line 829 can be introduced to the one or more gasoline splitters 765 and selectively separated therein to provide an overhead 867 containing $C_4$-$C_6$ hydrocarbons and a bottoms 869 containing $C_7$ and heavier hydrocarbons. In one or more embodiments, at least a portion of the $C_4$-$C_6$ hydrocarbons in line 867 can be recycled to the FCC system 600 and/or hydrocarbon feed in line 635 (not shown). In one or more embodiments, about 5% wt, about 15% wt, about 25% wt, about 35% wt, about 45% wt, about 55% wt, or about 65% wt of the $C_4$-$C_6$ hydrocarbons via line 867 can be recycled to the FCC system 600 and/or hydrocarbon feed in line 635.

In one or more embodiments, at least a portion of the $C_4$-$C_6$ hydrocarbons via line 867 can be recycled to the cracker 802 and/or refinery feed 801 (not shown). For example, from about 55% wt to about 95% wt; about 55% wt to about 65% wt; about 65% wt to about 75% wt; about 75% wt to about 85% wt; or about 85% wt to about 95% wt of the $C_4$-$C_6$ hydrocarbons via line 867 can be recycled to the cracker 802 and/or refinery feed 801 (not shown). In one or more embodiments, from about 10% wt to about 20% wt; about 20% wt to about 30% wt; about 30% wt to about 40% wt; or about 40% wt to about 50% wt of the $C_4$-$C_6$ hydrocarbons via line 867 can be recycled to the cracker 802 and/or refinery feed 801 (not shown).

In one or more embodiments, at least a portion of the $C_4$-$C_6$ hydrocarbons via line 867 can be recycled to the FCC system 600 and at least a portion to the cracker 802. In one or more embodiments, about 10% wt to about 60% wt, about 10% wt to about 35% wt, about 25% wt to about 45% wt, or about 35% wt to about 60% wt of the $C_4$-$C_6$ hydrocarbons via line 867 can be recycled to the FCC system 600 with the balance recycled to the cracker 802. In one or more embodiments, from about 25% wt to about 99% wt, from about 25% wt to about 55% wt, from about 45% wt to about 65% wt, from about 55% wt to about 85% wt, or from about 65% wt to 100% wt of the $C_4$-$C_6$ hydrocarbons via line 867 can be recycled to the FCC system 600 with the balance to the cracker 802. Recycling at least a portion of the $C_4$-$C_6$ hydrocarbons to the FCC system 600 can increase the production of aromatic BTX. Recycling at least a portion of the $C_4$-$C_6$ hydrocarbons via line 867 to the cracker 802 can increase the production of propylene by increasing the concentration of $C_4$ and higher compounds in the cracker 802.

The gasoline splitter bottoms via line 869, containing $C_7$ and heavier hydrocarbons, can be stabilized using one or more gasoline hydrotreaters 770 to provide a treated gasoline via line 872. In one or more embodiments, at least a portion of the $C_7$ and heavier hydrocarbons in line 869 can be recycled to the cracker 802 via recycle line 882. In one or more embodiments, about 10% wt to about 20% wt, about 15% wt to about 35% wt, about 30% wt to 55% wt, about 50% wt to about 75% wt, or about 65% wt to about 80% wt of the $C_7$ and heavier hydrocarbons via line 869 can be recycled to the cracker 802 via recycle line 882. Recycling at least a portion of the $C_7$ and heavier hydrocarbons to the cracker 882 can increase the production of ethylene.

The treated gasoline via line 872 can be introduced to one or more BTX units 775 and selectively separated therein to provide aromatics, including, but not limited to, benzene, toluene, xylene, mixtures thereof, or combinations thereof via line 877, and a raffinate via line 879. The aromatics content of the raffinate in line 879 can be less than about 10% wt, 5% wt, or 1% wt BTX. In one or more embodiments, all or any portion of the raffinate via line 879 can be recycled to the FCC system 600. For example, at least 20% wt, 30% wt, 40% wt, or 50% wt of the raffinate in line 879 can be recycled to the FCC system 600. In one or more embodiments, at least 70% wt, 80% wt, or 90% wt of the raffinate in line 879 can be recycled to the FCC system 600.

Returning to the de-propanizer 725, The overhead, containing $C_3$ and lighter hydrocarbons in line 827 can be compressed using the one or more compressors 730 to provide compressed $C_3$ and lighter hydrocarbons via line 832. The compressed $C_3$ and lighter hydrocarbons via line 832 can be chilled using the one or more chill trains 735 to provide an overhead containing hydrogen via line 839 and a bottoms containing $C_3$ and lighter hydrocarbons via line 837. In one or more embodiments, chilling the compressed $C_3$ and lighter hydrocarbons can further facilitate the separation of hydrogen and other non-condensable components via line 839 from the $C_3$ and lighter hydrocarbons via line 837.

The $C_3$ and lighter hydrocarbons via line 837 can be selectively separated using the one or more de-methanizers 740 to provide an overhead containing methane via line 842 and a bottoms containing $C_2$ and $C_3$ hydrocarbons via line 844. In one or more embodiments, all or any portion of the methane via line 842 can be recycled to the one or more compressors 730. Recycling at least a portion of the methane via line 842 can auto-refrigerate the compressed $C_3$ and lighter hydrocarbons via line 827 thereby improving the recovery of olefins, and increasing the propylene yield in the converted propylene production process.

The $C_2$ and $C_3$ hydrocarbons via line 844 can be selectively separated using the one or more de-ethanizers 750 to provide an overhead containing a $C_2$ hydrocarbon mixture via line 852 and a bottoms containing a $C_3$ hydrocarbon mixture via line 854. In one or more embodiments, one or more C2 splitters 755 can be used to selectively separate the $C_2$ hydrocarbon mixture via line 852 to provide an ethylene product via line 757 and an ethane product via line 759. One or more C3 splitters 760 can be used to selectively separate the $C_3$ hydrocarbon mixture via line 854 to provide a propylene product via line 762 and a propane product via line 764.

In one or more embodiments, all or any portion of the ethane product via line 759 and propane product via line 764 can be recycled to the FCC system 600 via recycle line 884. For example, from about 60% vol to about 100% vol; from about 70% vol to about 100% vol; from about 80% vol to about 100% vol; or from about 90% vol to about 100% vol of the ethane product via line 759 and from about 70% vol to about 100% vol, from about 80% vol to about 100% vol, or from about 90% vol to about 100% vol of the propane product via line 764 can be recycled to the FCC system 600 via line 884. In one or more embodiments, from about 15% vol to about 55% vol, from about 25% vol to about 55% vol, from about 35% vol to about 55% vol, or from about 45% vol to about 55% vol of the propane product via line 764 can be recycled to the FCC system 600. In at least one specific embodiment, from about 15% vol to about 45% vol, from about 25% vol to about 45% vol, or from about 35% vol to about 45% vol of the ethane product via line 884 can be recycled to the FCC system 600.

Figure 9:
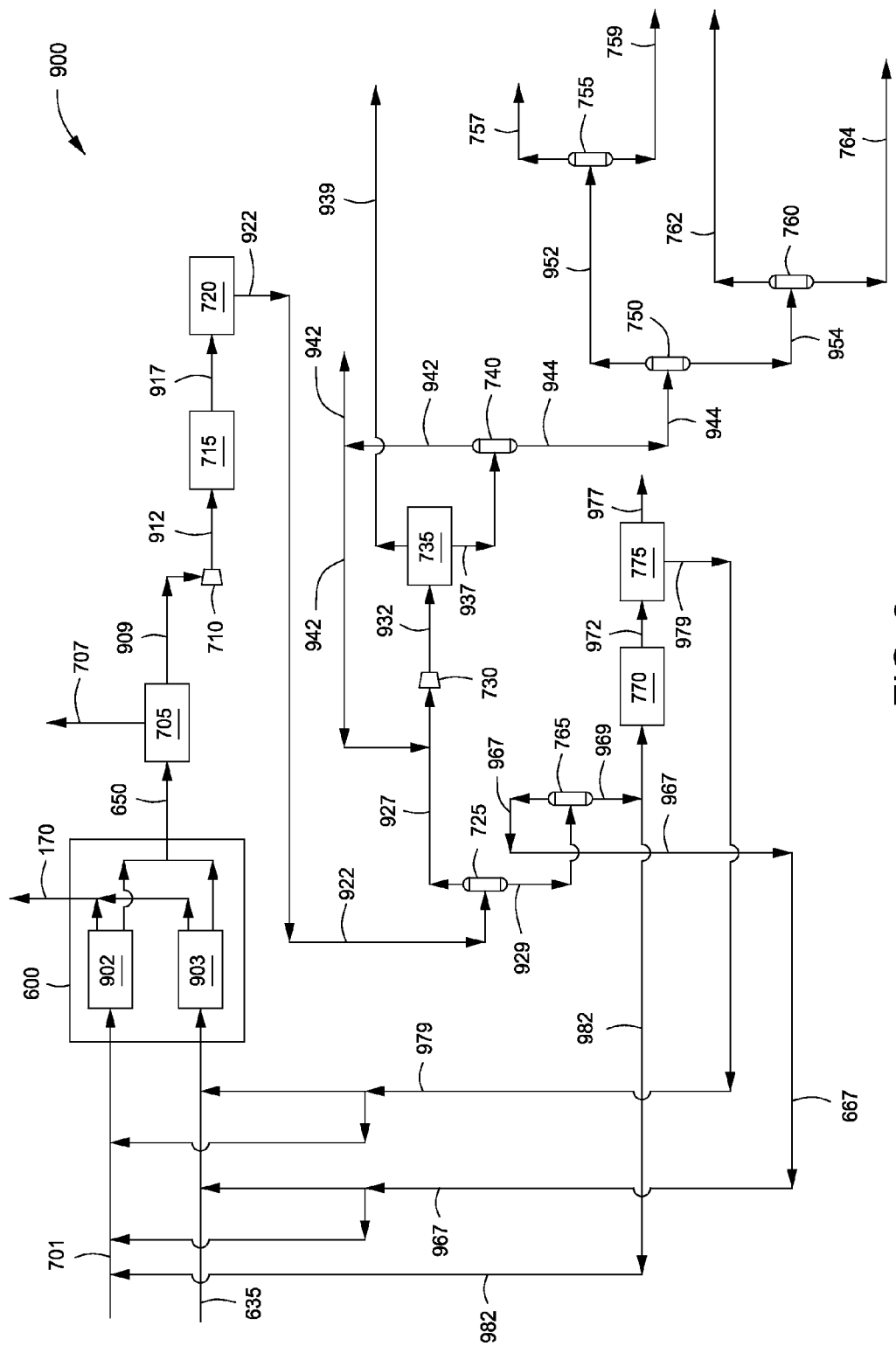
FIG. 9 depicts another illustrative system for producing one or more hydrocarbons, according to one or more embodiments described.

FIG. 9 depicts another illustrative system 900 for producing one or more hydrocarbons, according to one or more embodiments. In one or more embodiments, each FCC system 600 can include two or more risers or zones 902, 903 each independently operated at conditions sufficient to crack or otherwise selectively separate different feeds or cuts into one or more olefins. The refinery hydrocarbon (defined above) via line 701 can be introduced to the riser or first zone 902 and the feedstock via line 635 can be introduced to the second riser or cracking zone 903. The effluents from each riser or cracking zone 902, 903 can be combined, forming the first product ("hydrocarbon mixture") via line 650. The hydrocarbon mixture can be fractionated and purified using the one or more fractionators 705, treating units 715, 720 and columns 725, 765, 740, 750, 755, and 760, all as described above with reference to FIGS. 7 and 8, to provide multiple products including propylene, ethylene, propane and ethane.

As discussed and described above in reference to FIG. 6 a regenerator waste gas or flue gas form the FCC system 600 can be recovered via line 170. The two or more risers (two are shown 902, 903) can each have one or more independent regenerators (not shown) or the two or more risers can share a single or multiple regenerators (not shown) to provide the flue gas via line 170. The one or more independent regenerators and/or the shared single or multiple regenerators can be similar to the regenerators 140 discussed and described above with reference to FIGS. 1-5.

The first product via line 650 can be introduced to the one or more fractionators 705 and selectively separated therein to provide a naphthenic mixture via line 707 and an olefinic mixture via line 909. The naphthenic mixture can include, but is not limited to, light naphthas, heavy naphthas, naphthenic compounds, derivatives thereof, mixtures thereof, or combinations thereof. The olefinic mixture via line 909 can be compressed using the one or more compressors 710 to provide a compressed olefinic mixture via line 912, which can be treated using the one or more treating units 715 to provide a treated olefinic mixture via line 917. The treated olefinic mixture can be introduced to the one or more drying units 720 to provide dried olefinic mixture via line 922.

The dried olefinic mixture via line 922 can be introduced to the one or more de-propanizers 725 and selectively separated therein to provide an overhead containing $C_3$ and lighter hydrocarbons via line 927, and a bottoms containing $C_4$ and heavier hydrocarbons via line 929. The $C_4$ and heavier hydrocarbons via line 929 can be introduced to the one or more gasoline splitters 765 and selectively separated therein to provide an overhead containing $C_4$-$C_6$ hydrocarbons via line 967 and a bottoms containing $C_7$ and heavier hydrocarbons via line 969.

In one or more embodiments, at least a portion of the $C_4$-$C_6$ hydrocarbons via line 967 can be recycled to the first riser or cracking zone 902 and/or the second riser or cracking zone 903. For example, about 10% wt to about 60% wt, about 10% wt to about 35% wt, about 25% wt to about 45% wt, or about 35% wt to about 60% wt of the $C_4$-$C_6$ hydrocarbons via line 967 can be recycled to the first riser or cracking zone 902 with the balance recycled to the second riser or cracking zone 903. In one or more embodiments, from about 25% wt to about 100% wt, 25% wt to about 55% wt, about 45% wt to about 65% wt, about 55% wt to about 85% wt, or about 65% wt to 99% wt of the $C_4$-$C_6$ hydrocarbons via line 967 can be recycled to the first riser or cracking zone 902 with the balance to the second riser or cracking zone 903. Recycling at least a portion of the $C_4$-$C_6$ hydrocarbons via line 967 to the first riser or cracking zone 902 can increase the production of the aromatics (i.e. BTX). Recycling at least a portion of the $C_4$-$C_6$ hydrocarbons via line 967 to the second riser or cracking zone 903 can increase the production of propylene.

In one or more embodiments, at least a portion of the $C_7$ and heavier hydrocarbons via line 969 can be recycled via line 982 to the first riser or cracking zone 902. In one or more embodiments, from about 10% wt to about 20% wt; about 15% wt to about 35% wt; about 30% wt to 55% wt; about 50% wt to about 75% wt; or about 65% wt to about 80% wt of the $C_7$ and heavier hydrocarbons in line 969 can be recycled to the first riser or cracking zone 902 via recycle line 982. Recycling at least a portion of the $C_7$ and heavier hydrocarbons via line 982 can increase the production of ethylene by increasing the concentration of heavy hydrocarbons in the first riser or cracking zone 902.

The $C_7$ and heavier hydrocarbons via line 969 can be stabilized using the one or more gasoline hydrotreaters 770 to provide a treated gasoline via line 972. The treated gasoline via line 972 can be selectively separated using the one or more BTX units 775 to separate the aromatics via line 977 from a raffinate via line 979.

In one or more embodiments, at least a portion of the raffinate via line 979 can be recycled to the second riser or cracking zone 903. The raffinate via line 979 can be lean in aromatics. For example, the raffinate via line 979 can include less than about 10% wt, 5% wt, or 1% wt BTX. In one or more embodiments, at least 70% wt, 80% wt, or 90% wt of the raffinate via line 979 can be recycled to the second riser or cracking zone 903 with the balance to the first riser or cracking zone 902. In one or more embodiments, at least 20% wt, 30% wt, 40% wt, or 50% wt of the raffinate via line 979 can be recycled to the first riser or cracking zone 902. In one or more embodiments, at least 20% wt, 30% wt, 40% wt, or 50% wt of the raffinate via line 979 can be recycled to the second riser or cracking zone 903 with the balance to the first riser or cracking zone 902. In one or more embodiments, at least 70% wt, 80% wt, or 90% wt of the raffinate via line 979 can be recycled to the second riser or cracking zone 903 with the balance to the first riser or cracking zone 902.

Although not shown in FIG. 9, in one or more embodiments, all or any portion of the aromatics via line 977 can be recycled to the first riser or cracking zone 902. For example, at least 20% wt, 40% wt, 60% wt, 80% wt, or 90% wt of the aromatics via line 977 can be recycled to the first riser or cracking zone 902.

Returning to the de-propanizer 725, The $C_3$ and lighter hydrocarbons via line 927 can be compressed using the one or more compressors 730 to provide compressed $C_3$ and lighter hydrocarbons via line 932. The compressed $C_3$ and lighter hydrocarbons via line 932 can be chilled and separated using one or more chill trains 735 to provide an overhead containing hydrogen and non-condensable gases, mixtures thereof and combinations thereof via line 939, and a bottoms containing $C_3$ and lighter hydrocarbons via line 937.

The $C_3$ and lighter hydrocarbons via line 937 can be introduced to the one or more de-methanizers 740 and selectively separated therein to provide an overhead containing methane via line 942 and a bottoms containing $C_2$ and $C_3$ hydrocarbons via line 944. In one or more embodiments, all or any portion of the methane via line 942 can be recycled to the inlet of the one or more compressors 730. Recycling at least portion of the methane via line 942 auto-refrigerates the compressed $C_3$ and lighter hydrocarbons in line 927 thereby improving the recovery of olefins and increasing the propylene yield in the converted propylene production process.

The $C_2$ and $C_3$ hydrocarbons via line 944 can be introduced to the one or more de-ethanizers 750 and selectively separated therein to provide an overhead containing a $C_2$ hydrocarbon mixture via line 952 and a bottoms containing a $C_3$ hydrocarbon mixture via line 954. The $C_2$ hydrocarbon mixture via line 952 can be introduced to the one or more C2 splitters 755 and selectively separated therein to provide an ethylene product via line 757 and an ethane product via line 759. The one or more C3 splitters 760 can be used to selectively separate the $C_3$ hydrocarbon mixture via line 954 to provide the propylene product via line 762 and the propane product via line 764.

The risers 902, 903 can be similar to riser 605 discussed and described above with reference to FIG. 6. The risers 902, 903 can be operated at the same or different conditions with respect to one another. For example, the riser 902 to which the refinery hydrocarbon via line 701 can be introduced can operate at a higher temperature than the riser 903 to which the hydrocarbon feed via line 635 can be introduced.

Figure 10:
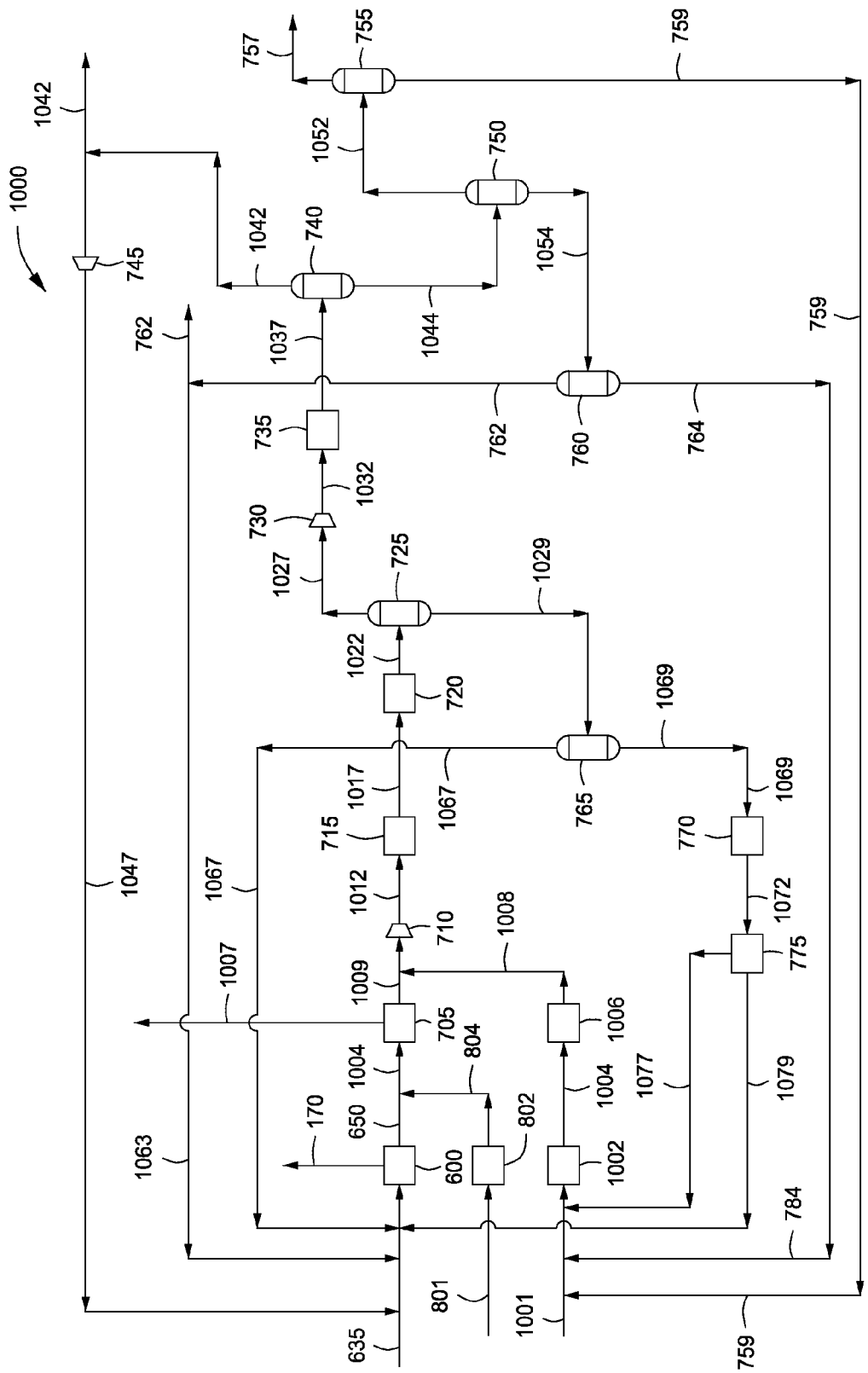
FIG. 10 depicts yet another illustrative system for producing one or more hydrocarbons, according to one or more embodiments described.

FIG. 10 depicts another illustrative system 1000 for producing one or more hydrocarbons, according to one or more embodiments. The hydrocarbon via line 635 can be introduced to the FCC system 600 and cracked therein to provide the first product via line 650. In one or more embodiments, one or more refinery hydrocarbons and/or light hydrocarbons via line 801 can be introduced to the cracker 802 and cracked therein to provide a cracked hydrocarbon via line 804. In one or more embodiments, one or more alkanes can be introduced via line 1001 to one or more steam pyrolytic crackers 1002 to provide an effluent ("cracked alkanes") via line 1004. The cracked alkanes via line 1004 can be cooled using one or more quench columns 1006 to provide a cooled effluent via line 1008. As discussed and described above in reference to FIGS. 1-6 a regenerator waste gas or flue gas form the FCC system 600 can be recovered via line 170.

Although not shown in FIG. 10, in one or more embodiments, one or more mixed hydrocarbon feeds can be introduced to one or more pre-fractionators. Within the one or more pre-fractionators, the mixed hydrocarbon feed can be fractionated or otherwise selectively separated to provide at least a portion of the feedstock in line 635, at least a portion of the one or more refinery hydrocarbons and/or light hydrocarbons via line 801, and/or at least a portion of the one or more alkanes via line 1001.

The first product via line 650 and the cracked hydrocarbon via line 804 can be combined to provide a second hydrocarbon mixture via line 1004. The hydrocarbon mixture in line 1004 can be fractionated using the one or more fractionators 705 to provide an olefinic mixture via line 1009 and a naphthenic mixture via line 1007. The olefinic mixture via line 1009 can be combined with the quenched effluent via line 1008 and purified using the one or more treating units 715, 720 and columns 725, 765, 740, 750, 755, and 760 to provide multiple products including propylene, ethylene, propane and ethane. Heavier $C_4$-$C_6$ hydrocarbons, separated from the finished products, can be recycled to the FCC system 600, cracker 802, and/or steam pyrolytic cracker 1002 as depicted in FIG. 10.

The one or more fractionators 705 can remove heavy naphtha, light cycle oil, slurry oil, or any combination thereof from the second hydrocarbon mixture to recover the olefinic mixture via line 1009 and the naphthenic mixture via line 1007. The olefinic mixture can include one or more $C_2$-$C_{10}$ olefins. The naphthenic mixture via line 1007 can include about 40% wt to about 90% wt $C_7$-$C_{12}$ hydrocarbons. The naphtha via line 1007 can include from about 5% wt to about 40% wt $C_7$, from about 5% wt to about 40% wt $C_8$, from about 5% wt to about 20% wt $C_9$, or from about 5% wt to about 10% wt $C_{10}$ and heavier hydrocarbons. The olefinic mixture via line 1009 can include 20% wt to 90% wt of the one or more $C_2$-$C_{10}$ hydrocarbons. The olefinic mixture can include from about 5% wt to about 30% wt $C_4$, from about 5% wt to about 30% wt $C_5$, from about 5% wt to about 30% wt $C_6$, and from about 5% wt to about 20% wt $C_7$ and heavier hydrocarbons. The olefinic mixture can exit the fractionator 705 at a pressure of about 100 kPa up to about 500 kPa.

The refinery and/or light hydrocarbons can be introduced to the cracker 802 at a temperature ranging from about 25° C. to about 300° C. The refinery and/or light hydrocarbons can be pre-heated to temperatures ranging from about 25° C. to about 200° C. prior to cracking.

The alkanes introduced via line 1001 to the steam pyrolytic cracker 1002 can include one or more paraffinic hydrocarbons having two or more carbon atoms. The alkanes can include one or more $C_2$-$C_{12}$ paraffinic hydrocarbons. The one or more alkanes can be introduced to the cracker 1002 at a temperature of about 25° C. to about 200° C. The one or more alkanes can be introduced to the steam pyrolytic cracker 1002 at a pressure of about 100 kPa to about 2,000 kPa.

The cracked hydrocarbons via line 804 can include 50% wt, 60% wt, or 70% wt $C_4$-$C_{10}$. The cracked hydrocarbons in line 804 can include from about 1% wt to about 10% wt $C_2$, from about 1% wt to about 20% wt $C_3$, from about 5% wt to about 25% wt $C_4$, from about 5% wt to about 25% wt $C_5$, and from about 30% wt to about 70% wt $C_6$ and heavier hydrocarbons. The cracked hydrocarbons can exit the fluidized catalytic cracker 802 at a temperature of about 400° C. to about 600° C.

The alkane feed via line 1001 can include methane, ethane, propane, mixtures thereof or combinations thereof. The alkane feed via line 1001 can include from about 70% wt, 80% wt, or 90% wt $C_2$-$C_3$ alkanes. The alkane feed via line 1001 can be introduced to the convection zone of the steam pyrolytic cracker 1002 at a temperature of about 100° C. to about 300° C. The alkane feed can be heated in the convection zone of the steam pyrolytic cracker 1002 to a temperature of about 400° C. to about 700° C. The alkane feed can be partially vaporized in the convection zone. For example, about 10% wt, 20% wt, 30% wt, 40% wt, or 50% wt of the alkane feed can be vaporized in the convection zone of the steam pyrolytic cracker 1002. In one or more embodiments, a minimum of 55% wt, 65% wt, 75% wt, 85% wt, 95% wt, or 100% wt of the alkane feed via line 1001 can be vaporized in the convection zone of the steam pyrolytic cracker 1002. The quenched effluent in line 1008 can include about 20% wt to about 60% wt ethane and about 5% wt to about 30% wt propane.

The quench column 1006 can be any device, system or combination of systems and/or devices suitable for reducing the temperature of the cracked hydrocarbon mixture in line 1004. In one or more embodiments, reducing the temperature of the cracked hydrocarbon can reduce or stop the rate of hydrocarbon cracking. The quench column 1006 can include packing media to provide surface area for the cracked alkanes and a heat transfer medium to make thermal contact. For example, the packing media can include rings, saddles, balls, irregular sheets, tubes, spirals, trays, baffles, or any combination thereof. The cooled hydrocarbons can exit the quench column 1006 via line 1008 at a temperature from about 25° C. to about 100° C.

The cooled hydrocarbons via line 1008 can be combined with the olefinic mixture via line 1009 and compressed using one or more compressors 410. The compressed olefinic mixture via line 712 can exit the one or more compressors 410 at a pressure of from about 500 kPa to about 4,000 kPa. The pressure of the compressed olefinic mixture via line 712 can range from about 500 kPa to 3,000 kPa; or about 500 kPa to 1,000 kPa. The compressed olefinic mixture in line 712 can be at a temperature of from about 40° C. to about 300° C.

The compressed olefinic mixture via line 712 can be treated using one or more treating units 715 to remove oxygenates, acid gases, water, or any combination thereof to provide a treated olefinic mixture via line 1017. The treated olefinic mixture via line 1017 can include less than about 500 ppmv $H_2S$, less than about 50 ppmv $H_2S$, or less than about 1 ppmv $H_2S$. The treated olefinic mixture in line 1017 can include less than about 500 ppmv $CO_2$, less than about 100 ppmv CO), or less than about 50 ppmv $CO_2$.

The treated olefinic mixture via line 1017 can be dried in the one or more drying units 720 to provide dried olefinic mixture via line 1022. The dried olefinic mixture can include less than 100 ppmv water; less than 10 ppmv water; or less than 0.1 ppmv water. The dried olefinic mixture can include less than 5 ppmv water; less than 1 ppmv water; or less than 0.5 ppmv water.

The dried olefinic mixture in line 1022 can be introduced to one or more de-propanizers 725 and selectively separated therein to provide an overhead containing $C_3$ and lighter hydrocarbons via line 1027, and a bottoms containing $C_4$ and heavier hydrocarbons via line 1029. The $C_3$ and lighter hydrocarbons via line 1027 can include 90% wt, 95% wt, or 99% wt $C_3$ and lighter hydrocarbons. The $C_3$ and lighter hydrocarbons can include hydrogen. The $C_3$ and lighter hydrocarbons can include from about 10% wt to about 40% wt $C_2$, from about 20% wt to about 70% wt $C_3$, and from about 0.1% wt to about 1% wt $H_2$. The $C_3$ and lighter hydrocarbons via line 1027 can exit the de-propanizer 725 at a pressure of from about 500 kPa to about 2,500 kPa. The pressure of the $C_3$ and lighter hydrocarbons in line 1027 can be from about 500 kPa to about 1,000 kPa.

The $C_4$ and heavier hydrocarbons via line 1029 can include 90% wt, 95% wt, or 99% wt $C_4$-$C_{10}$ hydrocarbons. The $C_4$ and heavier hydrocarbons via line 1029 can include from about 30% wt to about 80% wt $C_4$, from about 5% wt to about 30% wt $C_5$, from about 5% wt to about 20% wt $C_6$, and from about 5% wt to about 20% wt $C_7$ and heavier hydrocarbons.

The $C_4$ and heavier hydrocarbons via line 1029 can be introduced to the one or more gasoline splitters 765 and selectively separated therein to provide an overhead containing $C_4$-$C_6$ hydrocarbons via line 1067, and bottoms containing $C_7$ and heavier hydrocarbons via line 1069. The $C_7$ and heavier hydrocarbons can include about 80% wt, 90% wt, or 95% wt $C_4$-$C_6$, and from about 5% wt to about 80% wt $C_7$ and heavier hydrocarbons. The $C_7$ and heavier hydrocarbons can include from about 40% wt to about 80% wt $C_4$, from about 5% wt to about 60% wt $C_5$, from about 1% wt to about 30% wt $C_6$, from about 1% wt to about 20% wt $C_7$, and from about 1% to about 10% wt $C_8$ and heavier hydrocarbons.

In one or more embodiments, at least a portion of the $C_4$-$C_6$ hydrocarbons via line 1067 can be recycled directly to the FCC system 600. For example, about 55% wt to about 65% wt; about 65% wt to about 75% wt; about 75% wt to about 85% wt; or about 85% wt to about 95% wt of $C_4$-$C_6$ hydrocarbons via line 1067 can be recycled to the FCC system 600. In one or more embodiments, about 10% wt to about 20% wt; about 20% wt to about 30% wt; about 30% wt to about 40% wt; or about 40% wt to about 50% wt of the $C_4$-$C_6$ hydrocarbons via line 1067 can be recycled to the FCC system 600. In one or more embodiments, at least a portion of the $C_4$-$C_6$ hydrocarbons via line 1067 can be combined with the hydrocarbon in line 635. In one or more embodiments, about 10% wt to about 20% wt; about 20% wt to about 30% wt; about 30% wt to about 40% wt; or about 40% wt to about 50% wt of $C_4$-$C_6$ hydrocarbons via line 1067 can be combined with the hydrocarbon in line 635. In one or more embodiments, about 5% wt to about 35% wt; about 15% wt to about 55% wt; about 45% wt to about 70% wt; about 60% wt to about 85% wt; or about 75% wt to about 100% wt of the $C_4$-$C_6$ hydrocarbons via line 1067 can be combined with hydrocarbon in line 635.

The $C_4$-$C_6$ hydrocarbons via line 1067 can include butanes and isobutane. The $C_4$-$C_6$ hydrocarbons can include from about 10% wt to about 50% wt butanes. The $C_4$-$C_6$ hydrocarbons can include from about 10% wt to about 50% wt isobutane. The $C_4$-$C_6$ hydrocarbons via line 1067 can include $C_4$-$C_6$ olefins from about 50% wt to about 90% wt $C_4$-$C_6$ olefins. The $C_4$-$C_6$ hydrocarbons via line 1067 can include from about 10% wt to about 50% wt $C_4$ olefins, from about 10% wt to about 50% wt $C_5$ olefins, and from about 5% wt to about 30% wt $C_6$ olefins.

The $C_7$ and heavier hydrocarbons via line 1069 can be stabilized using the one or more gasoline hydrotreaters 770 to provide a treated gasoline via line 1072. The treated gasoline can include from about 70% wt, 80% wt, or 90% wt $C_6$ and heavier hydrocarbons. The treated gasoline can include from about 75% wt to about 85% wt $C_6$, from about 15% wt to about 25% wt $C_7$, and from about 5% wt to about 10% wt $C_8$ and heavier hydrocarbons.

The treated gasoline in line 1072 can be selectively separated using the one or more benzene/toluene/xylene ("BTX") units 775 to separate the aromatics via line 1079, and a raffinate via line 1077. The aromatics concentration in line 1079 can include about 40% wt, about 50% wt, about 60% wt, about 70% wt, or about 80% wt BTX. The aromatics can include from about 10% wt to about 40% wt benzene, from about 20% wt to about 60% wt toluene, and from about 10% wt to about 40% wt xylene. In one or more embodiments, at least a portion of the aromatics via line 1079 can be directly recycled to the FCC system 600 (not shown in FIG. 10), or recycled to the FCC system 600 via line 635. In one or more embodiments, about 10% wt, about 20% wt, about 30% wt, or about 40% wt of the aromatics can be recycled to the FCC system 600. In at least one specific embodiment, about 10% wt, about 15% wt, or about 20% wt of the aromatics can be recycled to FCC system 600.

The raffinate via line 1077 can be lean in aromatics. For example, the raffinate can include less than about 40% wt, 30% wt, 20% wt, or 10% wt BTX. In one or more embodiments, at least a portion of the raffinate in line 1077 can be directly recycled (not shown) or recycled to the steam pyrolytic cracker 1002 via the alkane feed in line 1001. In one or more embodiments, about 20% wt, about 30% wt, about 40% wt, or about 50% wt of the raffinate can be recycled to the steam pyrolytic cracker 1002. In one or more embodiments, about 70% wt, about 80% wt, or about 90% wt of the raffinate in line 1077 can be recycled to the steam pyrolytic cracker 1002 via the alkane feed in line 1001.

Returning to the de-propanizer 725, The $C_3$ and lighter hydrocarbons exiting via line 1027 can be compressed using the one or more compressors 730. In one or more embodiments, compressing the $C_3$ and lighter hydrocarbons can facilitate the separation of lighter hydrocarbons from the heavier hydrocarbons via line 1027. The compressed $C_3$ and lighter hydrocarbons exiting the one or more compressors 730 via line 1032 can have a pressure of about 500 kPa to about 3,500 kPa. The compressed $C_3$ and lighter hydrocarbons can exit the one or more compressors 730 at a pressure of about 500 kPa to about 1,500 kPa. The compressed $C_3$ and lighter hydrocarbons can exit the one or more compressors 730 at a temperature of about 5° C. to about 100° C.

The compressed $C_3$ and lighter hydrocarbons via line 1032 can be chilled using the one or more chill trains 735 to provide chilled $C_3$ and lighter hydrocarbons via line 1037. The chilled $C_3$ and lighter hydrocarbons can exit the one or more chill trains 735 at a temperature of about −40° C. to about 40° C. The chilled $C_3$ and lighter hydrocarbons can have a temperature from about −20° C. to about 5° C.

The chilled $C_3$ and lighter hydrocarbons via line 1037 can be introduced to the one or more de-methanizers 740 and selectively separated therein to provide an overhead containing methane via line 1042 and a bottoms containing $C_2$ and $C_3$ hydrocarbons via line 1044. The de-methanizer overhead in line 1042 can include from about 50% wt to about 95% wt methane. The overhead in line 1042 can include about 70% wt, about 80% wt, or about 90% wt methane. The pressure of the overhead in line 1042 can range from about 300 kPa to about 1,000 kPa. The de-methanizer bottoms in line 1044 can include from about 20% wt to about 50% wt $C_2$ and from about 40% wt to about 80% wt $C_3$.

The methane via line 1042 can be directly recycled to the FCC system 600 via line 635. The methane exiting the de-methanizer 740 can be compressed using the one or more compressors 745 to provide a compressed methane via line 1047 which can be recycled to the FCC system 600 via line 635, as shown or recycled directly to FCC system 600 (not shown). In one or more embodiments, about 15% vol to about 35% vol; about 20% vol to about 35% vol; about 25% vol to about 35% vol; or about 30% vol to 35% vol of the methane via line 1042 can be recycled to the FCC system 600. The compressed methane via line 1047 can be at a pressure of about 100 kPa to about 1,000 kPa, and a temperature of about 25° C. to about 200° C. In one or more embodiments, at least a portion of the methane in line 1042 can be removed via line 1042 as a final product.

The $C_2$ and $C_3$ hydrocarbons via line 1044 can be introduced to the one or more de-ethanizers 750 and selectively separated therein to provide an overhead containing a $C_2$ hydrocarbon mixture via line 1052 and a bottoms containing a $C_3$ hydrocarbon mixture via line 1054. The overhead in line 1052 can include about 90% wt, about 95% wt, or about 99% wt $C_2$. The overhead in line 1052 can include from about 5% wt to about 70% wt ethane and from about 30% wt to about 95% wt ethylene. The bottoms in line 1054 can include about 90% wt, about 95% wt, or about 99% wt $C_3$. The bottoms in line 1054 can include from about 5% wt to about 30% wt propane and from about 70% wt to about 95% wt propylene.

The $C_2$ hydrocarbon mixture via line 1052 can be introduced to the one more C2 splitters 755 and selectively separated therein to provide an overhead ("ethylene product") via line 757 and a bottoms ("ethane product") via line 759. The ethylene product in line 757 can include about 90% wt, about 95% wt, or about 99% wt ethylene. The ethylene product in line 757 can include about 95% wt, about 99% wt, or about 99.9% wt ethylene. The ethane product in line 759 can include about 90% wt, about 95% wt, or about 99% wt ethane. The ethane product in line 759 can include about 95% wt, about 99% wt, or about 99.9% wt ethane.

The $C_3$ hydrocarbon mixture via line 1054 can be introduced to one or more C3 splitters 760 and selectively separated therein to provide an overhead ("propylene product" or "second product") via line 762 and a bottoms ("propane product") via line 764. The propane product in line 764 can include about 90% wt, about 95% wt, or about 99% wt propane. The propylene product in line 762 can include about 80% wt, about 90% wt, or about 95% wt propylene.

In one or more embodiments, all or any portion of the propylene product via line 762 can be recycled via line 1063 to the hydrocarbon feed in line 635 and/or FCC system 600 (not shown). Recycling at least a portion of the propylene to the FCC system 600 via the hydrocarbon feed in line 635 or directly can suppress propylene production in the FCC system 600, thereby preferentially increasing the ethylene yield. In one or more embodiments, about 10% vol to about 60% vol; about 20% vol to about 60% vol; about 30% vol to about 60% vol; about 40% vol to about 60% vol; or about 50% vol to about 60% vol of the propylene product in line 762 can be recycled via line 1063 to the hydrocarbon feed in line 635 and/or FCC system 600. In one or more embodiments, about 60% vol to about 100% vol; about 70% vol to about 100% vol; about 80% vol to about 100% vol; or about 90% vol to about 100% vol of the propylene product in line 762 can be recycled via line 1063 to the hydrocarbon feed in line 635 and/or FCC system 600.

In one or more embodiments, all or any portion of the ethane product via line 759 can be recycled to the one or more steam pyrolytic crackers 1002 via the alkane feed in line 1001. In one or more embodiments, all or any portion of the propane product via line 764 can be recycled to the one or more steam pyrolytic crackers 1002 via the alkane feed in line 1001. For example, about 60% vol to about 100% vol; about 70% vol to about 100% vol; about 80% vol to about 100% vol; or about 90% vol to about 100% vol of the ethane product via line 759 and about 70% vol to about 100% vol; about 80% vol to about 100% vol; or about 90% vol to about 100% vol of the propane product via line 764 can be recycled to the one or more steam pyrolytic crackers 1002, either directly or via the alkane feed in line 1001. In one or more embodiments, about 15% vol to about 55% vol; about 25% vol to about 55% vol; about 35% vol to about 55% vol; or about 45% vol to about 55% vol of the propane product via line 764 can be recycled to the one or more steam pyrolytic crackers 1002. In one or more embodiments, about 15% vol to about 45% vol; about 25% vol to about 45% vol; or about 35% vol to about 45% vol of the ethane product via line 759 can be recycled to the one or more steam pyrolytic crackers 1002. In one or more embodiments, at least a portion of the ethane product in line 759 can be removed as a finished product.

Prophetic Examples

Embodiments of the present invention can be further described with the following simulated processes. The following simulated process results are based on a mathematical model simulating both combustion kinetics and fluid bed hydrodynamics. Tables 1-6 illustrate a base case and a base case modified according to embodiments discussed and described herein. Table 1 shows simulated process results for a base case A in which a distributor 150 is positioned within the lower portion or first zone 146 of the dense phase catalyst zone 145 (note that the configuration for base case A is not depicted in FIGS. 1-6). Therefore, the spent catalyst and carrier fluid mixture for base case A is introduced to the lower zone 146. Modified case A, in contrast, places the distributor 150 above the surface 149 of the dense phase catalyst zone 145, thereby introducing the spent catalyst/carrier fluid mixture above the surface 149 of the dense phase catalyst zone 145 and into the upper or transitional zone 148, as discussed and described above with reference to FIG. 1. For Tables 1-3 the carrier fluid introduced via line 129 is air. No CO promoter is used in either the base case A or the modified case A. It should be noted that for every case, i.e. base cases A-C and modified cases A-C shown in Tables 1-3, the coke burning rate remains the same with 5,350 kg/hr of coke burned.

TABLE 1

| | | Base Case A | Modified Case A |
|---|---|---|---|
| Carrier Fluid Introduced via Line 129 | | Air | Air |
| Spent Catalyst Inlet Temperature, ° C. | | 537 | 537 |
| Regenerated Catalyst Outlet Temperature, ° C. | | 712 | 706 |
| Carbon Content (wt %) on Regenerated Catalyst | | 0.03 | 0.05 |
| Carbon Content (wt %) on Spent Catalyst | | 0.78 | 0.80 |
| Coke Burning Rate, kg/hr | | 5348 | 5348 |
| Total Catalyst Inventory, kg | | 73.8 | 80.8 |
| Lower Zone 146 of Fluidized Catalyst Bed Conditions | Temperature, ° C. | 702 | 706 |
| | Density, kg/m$^3$ | 410 | 455 |
| | Superficial Gas Velocity, m/s | 0.82 | 0.53 |
| | wt % Carbon in Catalyst Bed | 0.06 | 0.05 |
| | CO % mol leaving First Zone | 1.28 | 1.02 |
| | NOx ppm leaving First Zone | 66.5 | 78.4 |
| | O$_2$ % mol leaving First Zone | 8.94 | 6.58 |
| | Coke Burning Rate, kg/hr | 3626 | 2788 |
| | Catalyst Inventory, tonnes | 20.0 | 22.1 |
| Middle Zone 147 of Fluidized Catalyst Bed Conditions | Temperature, ° C. | 712 | 697 |
| | Density, kg/m$^3$ | 402 | 450 |
| | Superficial Gas Velocity, m/s | 0.89 | 0.56 |
| | wt % Carbon in Catalyst Bed | 0.03 | 0.09 |
| | CO % mol leaving Catalyst Bed | 0.65 | 2.04 |
| | NOx ppm leaving Second Zone | 82.5 | 1.5 |
| | O$_2$ % mol leaving Second Zone | 3.07 | 0.2 |
| | Coke Burning Rate, kg/hr | 1495 | 1280 |
| | Catalyst Inventory, tonnes | 40.6 | 45.4 |
| Upper Zone 148 of Fluidized Catalyst Bed Conditions | Temperature, ° C. | 713 | 641 |
| | Density, kg/m$^3$ | 399 | 150 |
| | Superficial Gas Velocity, m/s | 0.93 | 0.86 |
| | wt % Carbon in Catalyst Bed | 0.03 | 0.32 |
| | CO % mol leaving Third Zone | 0.64 | 1.64 |
| | NOx ppm leaving Third Zone | 81.5 | 10.5 |
| | O$_2$ % mol leaving Third Zone | 2.94 | 6.75 |
| | Coke Burning Rate, kg/hr | 91 | 183 |
| | Catalyst Inventory, tonnes | 1.43 | 1.45 |
| Dilute Phase Zone 155 | Carbon Content (wt %) | 0.01 | 0.19 |
| | CO % mol leaving Dilute Phase Zone | 0.03 | 1.24 |
| | NOx ppm leaving Dilute Phase Zone | 165 | 16 |
| | O$_2$ % mol leaving Dilute Phase Zone | 2.14 | 2.73 |
| | Coke Burning Rate, kg/hr | 136 | 1097 |
| Cyclone 165 | Cyclone Inlet Temperature, ° C. | 718 | 678 |
| | Cyclone Outlet Temperature, ° C. | 721 | 778 |
| | Cyclone Catalyst Loading, tonnes/min | 14.0 | 13.3 |
| Flue Gas Composition via line 170 | CO % mol | 0 | 0 |
| | NOx ppm | 165 | 16 |
| | O$_2$% mol | 2.12 | 2.12 |

As shown in Table 1, base case A provides a flue gas via line 170 that contains 165 ppm NOx, while the modified case A provides a flue gas via line 170 that contains 15.7 ppm. With the exception of the lower zone 146 the amount of NOx within the regenerator 140 for the modified case A is less than for the base case A. For example, the NOx concentration in the middle zone 147 in the modified case A is 1.5 ppm NOx versus 82.5 ppm NOx for the base case A and for the NOx concentration in the upper zone 148 in the modified case A is 10.5 ppm NOx versus 81.5 ppm NOx for the base case A.

As shown in Table 1, the CO and carbon present within the regenerator 140 in the middle zone 147, upper zone 148, and dilute phase catalyst zone 155 increased for the modified case A. The increase in CO and carbon within these zones increases the amount of NOx that can be converted to N$_2$ within the regenerator 140, thereby providing a flue gas via line 170 having a reduced NOx content. As illustrated in Table 1, the flue gas via line 170 for the modified case A contains about 90.5% less NOx than in base case A (165 ppm NOx for the base case A compared to 15.7 ppm NOx for the modified case A).

As shown in Table 1, the temperature of the flue gas at the cyclone 165 inlet for base case A is 718° C., while the temperature of the flue gas at the cyclone 165 outlet is 721° C., which is only a 3° C. temperature difference. However, for the modified case A the temperature of the flue gas at the cyclone 165 inlet is 678° C. and the temperature of the flue gas at the cyclone 165 outlet is 778° C., a 100° C. difference. This increased temperature difference for the modified case A is attributed to afterburning of the CO within the cyclone 165, as discussed and described above with reference to FIG. 1. The increase in temperature within the cyclones 165 and the flue gas via line 170 remains within operationally acceptable ranges, while providing a flue gas having reduced NOx concentrations.

Table 2 shows simulated process results for a base case B and a modified case B, which are both the same as discussed above with reference to Table 1, except a medium activity level CO promoter has been introduced to the catalyst regeneration system for both the base case B and the modified case B, as discussed and described above with reference to FIG. 2. For these simulated results the medium activity level CO promoter was platinum at a concentration of 0.7 ppm in the catalyst regeneration system.

TABLE 2

| | | Base Case B | Modified Case B |
|---|---|---|---|
| Carrier Fluid Introduced via Line 129 | | Air | Air |
| Spent Catalyst Inlet Temperature, ° C. | | 537 | 537 |
| Regenerated Catalyst Outlet Temperature, ° C. | | 712 | 707 |
| Carbon Content (wt %) on Regenerated Catalyst | | 0.03 | 0.05 |
| Carbon Content (wt %) on Spent Catalyst | | 0.78 | 0.8 |
| Coke Burning Rate, kg/hr | | 5348 | 5348 |
| Total Catalyst Inventory, tonnes | | 73.8 | 80.7 |
| Lower Zone 146 of Fluidized Catalyst Bed Conditions | Temperature, ° C. | 703 | 707 |
| | Density, kg/m$^3$ | 408 | 455 |
| | Superficial Gas Velocity, m/s | 0.82 | 0.53 |
| | wt % Carbon in Catalyst Bed | 0.06 | 0.05 |
| | CO % mol leaving First Zone | 0.91 | 0.82 |
| | NOx ppm leaving First Zone | 91.1 | 85.2 |
| | O$_2$ % mol leaving First Zone | 8.73 | 5.26 |
| | Coke Burning Rate, kg/hr | 3399 | 2992 |
| | Catalyst Inventory, tonnes | 20 | 22.1 |
| Middle Zone 147 of Fluidized Catalyst Bed Conditions | Temperature, ° C. | 712 | 697 |
| | Density, kg/m$^3$ | 402 | 449 |
| | Superficial Gas Velocity, m/s | 0.89 | 0.56 |
| | wt % Carbon in Catalyst Bed | 0.03 | 0.1 |
| | CO % mol leaving Catalyst Bed | 0.49 | 1.56 |
| | NOx ppm leaving Second Zone | 107 | 1.1 |
| | O$_2$ % mol leaving Second Zone | 2.99 | 0.1 |
| | Coke Burning Rate, kg/hr | 1768 | 1042 |
| | Catalyst Inventory, tonnes | 40.6 | 45.3 |
| Upper Zone 148 of Fluidized Catalyst Bed | Temperature, ° C. | 713 | 642 |
| | Density, kg/m$^3$ | 397 | 150 |
| | Superficial Gas Velocity, m/s | 0.93 | 0.86 |
| | wt % Carbon in Catalyst Bed | 0.03 | 0.33 |

TABLE 2-continued

|  |  | Base Case B | Modified Case B |
|---|---|---|---|
| Conditions | CO % mol leaving Third Zone | 0.48 | 1.31 |
|  | NOx ppm leaving Third Zone | 106 | 12.9 |
|  | $O_2$ % mol leaving Third Zone | 2.86 | 6.67 |
|  | Coke Burning Rate, kg/hr | 45 | 181 |
|  | Catalyst Inventory, tonnes | 1.43 | 1.45 |
| Dilute Phase | Carbon Content (wt %) | 0.015 | 0.197 |
| Zone 155 | CO % mol leaving Dilute Phase Zone | 0.03 | 1.05 |
|  | NOx ppm leaving Dilute Phase Zone | 185 | 18 |
|  | $O_2$ % mol leaving Dilute Phase Zone | 2.14 | 2.64 |
|  | Coke Burning Rate, kg/hr | 136 | 1133 |
| Cyclone 165 | Cyclone Inlet Temperature, ° C. | 717 | 678 |
|  | Cyclone Outlet Temperature, ° C. | 719 | 762 |
|  | Cyclone Catalyst Loading, tonnes/min | 14.0 | 13.3 |
| Flue Gas | CO % mol | 0 | 0 |
| Composition | NOx ppm | 186 | 18 |
| via line 170 | $O_2$ % mol | 2.12 | 2.12 |

Table 2 shows similar results as Table 1, however the NOx concentration in the flue gas via line 170 is slightly higher for both the base case B and the modified case B, which is 186 ppm NOx and 17.9 ppm NOx, respectively. This result is expected because the presence of the medium activity CO promoter results in more complete combustion of the CO and, therefore, less CO is present within the regenerator that can react with the NOx to provide $CO_2$ and $N_2$. However, the increase in NOx for the modified case B is only slight, i.e. 2.2 ppm NOx, over the modified base case A.

The use of the medium activity level CO promoter also results in less CO afterburning for the modified case B than in the modified case A. This reduction in CO afterburning can be seen by the reduction in the temperature rise of the flue gas between the inlet and outlet of the cyclone 165. Specifically, the flue gas enters the cyclone 165 at a temperature of 678° C. and exits the cyclone 165 at a temperature of 762° C. Therefore, the modified case B provides a flue gas via line 170 having a temperature of 16° C. less than the flue gas provided in modified case A.

Table 3 shows simulated process results for a base case C and a modified case C, which are both the same as in Table 1, except a high activity CO promoter has been introduced to the catalyst regeneration system for both the base case C and the modified case C, as discussed and described above with reference to FIG. 2. For these simulated results the high activity level CO promoter was platinum at a concentration of 1.5 ppm in the catalyst regeneration system.

TABLE 3

|  |  | Base Case C | Modified Case C |
|---|---|---|---|
| Carrier fluid introduced via line 129 |  | Air | Air |
| Catalyst Regeneration Temperature, ° C. |  | 712 | 711 |
| Carbon Content (wt %) on Regenerated Catalyst |  | 0.03 | 0.07 |
| Carbon Content (wt %) on Spent Catalyst |  | 0.78 | 0.81 |
| Coke Burning Rate, kg/hr |  | 5348 | 5348 |
| Total Catalyst Inventory, tonnes |  | 73.8 | 80.7 |
| First | Temperature, ° C. | 703 | 711 |
| Zone 146 of | Density, kg/m³ | 408 | 455 |
| Fluidized | Superficial Gas Velocity, m/s | 0.82 | 0.54 |
| Catalyst Bed | wt % Carbon in Catalyst Bed | 0.06 | 0.07 |
| Conditions | CO % mol leaving First Zone | 0.43 | 0.45 |
|  | NOx ppm leaving First Zone | 184 | 117 |
|  | $O_2$ % mol leaving First Zone | 8.46 | 3.56 |
|  | Coke Burning Rate, kg/hr | 3399 | 3263 |
|  | Catalyst Inventory, tonnes | 20 | 22.1 |

TABLE 3-continued

|  |  | Base Case C | Modified Case C |
|---|---|---|---|
| Second | Temperature, ° C. | 712 | 699 |
| Zone 147 of | Density, kg/m³ | 402 | 449 |
| Fluidized | Superficial Gas Velocity, m/s | 0.88 | 0.57 |
| Catalyst Bed | wt % Carbon in Catalyst Bed | 0.03 | 0.12 |
| Conditions | CO % mol leaving Catalyst Bed | 0.25 | 0.81 |
|  | NOx ppm leaving Second Zone | 204 | 0.8 |
|  | $O_2$ % mol leaving Second Zone | 2.87 | 0.03 |
|  | Coke Burning Rate, kg/hr | 1768 | 680 |
|  | Catalyst Inventory, tonnes | 40.6 | 45.3 |
| Third | Temperature, ° C. | 713 | 643 |
| Zone 148 of | Density, kg/m³ | 397 | 150 |
| Fluidized | Superficial Gas Velocity, m/s | 0.93 | 0.86 |
| Catalyst Bed | wt % Carbon in Catalyst Bed | 0.03 | 0.34 |
| Conditions | CO % mol leaving Third Zone | 0.24 | 0.79 |
|  | NOx ppm leaving Third Zone | 199 | 21 |
|  | $O_2$ % mol leaving Third Zone | 2.75 | 6.58 |
|  | Coke Burning Rate, kg/hr | 45 | 227 |
|  | Catalyst Inventory, tonnes | 1.43 | 1.45 |
| Dilute Phase | Carbon Content (wt %) | 0.02 | 0.2 |
| Zone 155 | CO % mol leaving Dilute Phase Zone | 0.31 | 1.05 |
|  | NOx ppm leaving Dilute Phase Zone | 263 | 27 |
|  | $O_2$ % mol leaving Dilute Phase Zone | 2.12 | 2.44 |
|  | Coke Burning Rate, kg/hr | 136 | 1178 |
| Cyclone 165 | Cyclone Inlet Temperature, ° C. | 715 | 681 |
|  | Cyclone Outlet Temperature, ° C. | 718 | 733 |
|  | Cyclone Catalyst Loading, tonnes/min | 14.0 | 13.3 |
| Flue Gas | NOx ppm | 263 | 27 |
| Composition | CO % mol | 0 | 0 |
| via line 170 | $O_2$ % mol | 2.12 | 2.12 |

Table 3 shows similar results as Tables 1 and 2, however the NOx concentration in the flue gas via line 170 is higher for both the base case C and the modified case C, which is 263 ppm NOx and 26.8 ppm NOx, respectively. Again this result is expected because the presence of the high activity CO promoter results in a further combustion of the CO and a further reduction in CO afterburning than in the base cases A and B and the modified cases A and B. The further reduction of CO afterburning can be seen by the further decrease in the temperature rise of the flue gas between inlet and outlet of the cyclone 165. Specifically, the flue gas enters the cyclone 165 at a temperature of 681° C. and exits the cyclone 165 at a temperature of 733° C. Therefore, the modified case C provides a flue gas via line 170 having a temperature 45° C. less than the flue gas provided in modified case A and 29° C. less than the flue gas provided in modified case B.

The increase in NOx in the flue gas for the modified case C still results in a flue gas in line 170 having a reduced NOx concentration versus the base case C (26.8 ppm NOx versus 263 ppm NOx). Furthermore, the increase in NOx in the flue gas for the modified case C still results in a flue gas in line 170 having a reduced NOx concentration versus the base case A which did not use a CO promoter (26.8 ppm NOx versus 165 ppm NOx).

Table 4 shows various operating and other simulation conditions used for the determination of the simulated results.

TABLE 4

|  |  | Base Cases A-C | Modified Cases A-C |
|---|---|---|---|
| Geometries | Bed Level, m | 6.49 | 6.49 |
|  | Bed Diameter of Bottom Section, m | 5.49 | 5.49 |

TABLE 4-continued

|  |  | Base Cases A-C | Modified Cases A-C |
|---|---|---|---|
| Conditions | Top Section Heights, m | 8.96 | 8.96 |
|  | Top Section Diameter, m | 5.49 | 5.49 |
|  | Catalyst Circulation Rate, kg/min | 11200 | 11200 |
|  | Spent Catalyst Temperature, °C. | 538 | 538 |
|  | Regenerator Top Pressure, kPa | 177 | 177 |
|  | Spent Catalyst Lift Gas (not air), m$^3$/min | 0 | 0 |
|  | Total Combustion Air, m$^3$/min | 1050 | 1050 |
|  | Combustion Air to Air Grids, m$^3$/min | 682 | 682 |
|  | Combustion Air to Spent Catalyst Line, m$^3$/min | 368 | 368 |
|  | Air from Air Blower to Upper Zone 148 | 0 | 0.35 |
|  | Air from Air Blower to Middle Zone 147 | 0 | 0 |
|  | Air from Air Blower to Lower Zone 146 | 1 | 0.65 |
|  | Catalyst Flow from Reactor to Upper Zone 148 | 0 | 1 |
|  | Catalyst Flow from Reactor to Middle Zone 147 | 0 | 0 |
|  | Catalyst Flow from Reactor to Lower Zone 146 | 1 | 0 |
|  | Catalyst Cooler Duty, kJ/hr | 0 | 0 |
|  | Carbon on Spent - Regenerated Catalyst, wt % cat | 0.75 | 0.75 |
|  | H$_2$ in Coke Burned, wt % | 6 | 6 |
|  | Delta Nitrogen, wt ppm | 112 | 112 |
| Tuning Parameters | Catalytic CO Burn Factor (CO promoter) | 0.5-3 | 0.5-3 |

The information in the rows labeled "Geometries" describe the size of the regenerator and the depth (bed level) of the dense phase catalyst bed contained within the regenerator. The top section height refers to the vertical height of the dilute phase catalyst zone within the regeneration vessel. The spent catalyst temperature is the temperature of the coked catalyst particles when introduced to the regeneration vessel. The regenerator top pressure is the pressure of the vapor in the uppermost region of the regenerator. Spent catalyst lift gas refers to the rate of gas (other than air) that is used to transport spent catalyst into the regenerator. Combustion air refers to the total amount of air injected into the regenerator. The relative flow rates of air and catalyst into the different zones of the regenerator are also shown in Table 4. None of these cases include any heat removal from the regenerator via steam generation using a catalyst cooler or other device. The carbon on spent catalyst—regenerated catalyst refers to the change in concentration of carbon on the catalyst as the catalyst passes through the regeneration process. Hydrogen in coke is the percentage of hydrogen in the coke burned in the regenerator. Delta nitrogen refers to the change in concentration of nitrogen on the catalyst as the catalyst passes through the regeneration process.

Table 5 shows results for a base case D and modified case D that are similar to Table 1, except the carrier fluid has been changed to an oxygen-lean carrier fluid, namely a mixture of steam and combustion gas. Specifically, Table 5 shows simulated process results for a base case D in which the distributor 150 is positioned within the lower zone 146 of a dense phase catalyst zone 145 (note that the configuration for base case D is not depicted in FIGS. 1-6). As such, the spent catalyst and carrier fluid mixture is introduced to the first zone 146. Modified case D in contrast places the distributor 150 above the surface 149 of the fluidized catalyst bed 145, thereby introducing the spent catalyst/carrier fluid mixture above the surface 149 of the fluidized catalyst bed 145, as discussed and described above with reference to FIG. 1. For the simulated results shown in Table 5, a high activity level CO promoter was used. The particular CO promoter was platinum at a concentration of 1.5 ppm in the regeneration system. The coke burning rate remains the same, which is 5,350 kg/hr. The cyclone catalyst loading or entrainment rate within the dilute phase catalyst bed 155 was 14.0 kg/min for the base case D and 22.4 tonnes/min for the modified case D.

TABLE 5

|  |  | Base Case D | Modified Case D |
|---|---|---|---|
|  | Carrier fluid introduced via line 129 | Combustion Gas and Steam | Combustion Gas and Steam |
|  | Catalyst Regeneration Temperature, °C. | 712 | 711 |
|  | Carbon Content (wt %) on Regenerated Catalyst | 0.03 | 0.01 |
|  | Carbon Content (wt %) on Spent Catalyst | 0.78 | 0.76 |
|  | Coke Burning Rate, kg/hr | 5350 | 5350 |
|  | Total Catalyst Inventory, tonnes | 73.8 | 77.1 |
| First Zone 146 of Fluidized Catalyst Bed Conditions | Temperature, °C. | 703 | 711 |
|  | Density, kg/m$^3$ | 408 | 408 |
|  | Superficial Gas Velocity, m/s | 0.82 | 0.83 |
|  | wt % Carbon in Catalyst Bed | 0.06 | 0.01 |
|  | CO % mol leaving First Zone | 0.43 | 0.06 |
|  | NOx ppm leaving First Zone | 184 | 434 |
|  | O$_2$ % mol leaving First Zone | 8.46 | 18.05 |
|  | Coke Burning Rate, kg/hr | 3399 | 861 |
|  | Catalyst Inventory, tonnes | 20 | 20 |
| Second Zone 147 of Fluidized Catalyst Bed Conditions | Temperature, °C. | 712 | 713 |
|  | Density, kg/m$^3$ | 402 | 405 |
|  | Superficial Gas Velocity, m/s | 0.88 | 0.87 |
|  | wt % Carbon in Catalyst Bed | 0.03 | 0.02 |
|  | CO % mol leaving Catalyst Bed | 0.25 | 0.17 |
|  | NOx ppm leaving Second Zone | 204 | 471 |
|  | O$_2$ % mol leaving Second Zone | 2.87 | 8.65 |
|  | Coke Burning Rate, kg/hr | 1768 | 2674 |
|  | Catalyst Inventory, tonnes | 40.6 | 40.9 |
| Third Zone 148 of Fluidized Catalyst Bed Conditions | Temperature, °C. | 713 | 659 |
|  | Density, kg/m$^3$ | 397 | 150 |
|  | Superficial Gas Velocity, m/s | 0.93 | 0.87 |
|  | wt % Carbon in Catalyst Bed | 0.03 | 0.26 |
|  | CO % mol leaving Third Zone | 0.24 | 0.58 |
|  | NOx ppm leaving Third Zone | 199 | 107 |
|  | O$_2$ % mol leaving Third Zone | 2.75 | 7.81 |
|  | Coke Burning Rate, kg/hr | 45 | 272 |
|  | Catalyst Inventory, tonnes | 1.43 | 1.45 |
| Dilute Phase Zone 155 | Carbon Content (wt %) | 0.02 | 0.15 |
|  | CO % mol leaving Dilute Phase Zone | 0 | 0.46 |
|  | NOx ppm leaving Dilute Phase Zone | 263 | 41 |
|  | O$_2$ % mol leaving Dilute Phase Zone | 2.14 | 2.35 |
|  | Coke Burning Rate, kg/hr | 136 | 1541 |
| Cyclone 165 | Cyclone Inlet Temperature, °C. | 715 | 690 |
|  | Cyclone Outlet Temperature, °C. | 718 | 727 |
|  | Cyclone Catalyst Loading, tonnes/min | 14.0 | 22.4 |
| Flue Gas Composition via line 170 | NOx ppm | 263 | 41 |
|  | CO % mol | 0 | 0 |
|  | O$_2$ % mol | 2.12 | 2.12 |

As shown in Table 5, base case D provides a flue gas via line 170 that contains 265 ppm NOx, while the modified case D provides a flue gas via line 170 that contains only 41 ppm. The CO and carbon present within the regenerator 140 in the upper zone 148 and dilute phase catalyst zone 155 increased for the modified case D over the base case D. The increase in CO and carbon within these zones increases the amount of NOx that can be converted to N$_2$ within the regenerator 140, thereby providing a flue gas via line 170 having a substantially reduced NOx content for the modified case D versus the base case D. As illustrated in Table 5, the flue gas via line 170 for the modified case D contains about 84.4% less NOx than in base case D (263 ppm NOx for the base case D compared to only 41 ppm NOx for the modified case D).

As shown in Table 5, the temperature of the flue gas at the cyclone 165 inlet for base case D is 715° C., while the temperature of the flue gas at the cyclone 165 outlet is 718° C., which is only a 3° C. temperature difference. However, for the modified case D the temperature of the flue gas at the cyclone 165 inlet is 690° C. and the temperature of the flue gas at the cyclone 165 outlet is 727° C., a 37° C. difference. This increased temperature difference for the modified case D is attributed to afterburning of the CO within the cyclone 165, as discussed and described above with reference to FIG. 1. The increase in temperature within the cyclones 165 and the flue gas via line 170 remains within operationally acceptable ranges, while providing a flue gas having reduced NOx concentrations.

Similar to Table 4, Table 6 shows various operating and other simulation conditions used for the determination of the simulated results.

TABLE 6

| | | Base Case D | Modified Case D |
|---|---|---|---|
| Geometries | Bed Level, m | 6.49 | 6.49 |
| | Bed Diameter of Bottom Section, m | 5.49 | 5.49 |
| | Top Section Heights, m | 8.96 | 8.96 |
| | Top Section Diameter, m | 5.49 | 5.49 |
| Conditions | Catalyst Circulation Rate, kg/min | 11200 | 11200 |
| | Spent Catalyst Temperature, ° C. | 538 | 538 |
| | Regenerator Top Pressure, kPa | 177 | 177 |
| | Spent Catalyst Lift Gas (not air), m$^3$/min | 0 | 315 |
| | Total Combustion Air, m$^3$/min | 1050 | 1050 |
| | Combustion Air from Air Blower, m$^3$/min | 682 | 1050 |
| | Combustion Air to Spent Catalyst Carrier Line, m$^3$/min | 368 | 0 |
| | Air from Air Blower to Upper Zone 148 | 0 | 0 |
| | Air from Air Blower to Middle Zone 147 | 0 | 0 |
| | Air from Air Blower to Lower Zone 146 | 1 | 1 |
| | Catalyst Flow from Reactor to Upper Zone 148 | 0 | 1 |
| | Catalyst Flow from Reactor to Middle Zone 147 | 0 | 0 |
| | Catalyst Flow from Reactor to Lower Zone 146 | 1 | 0 |
| | Catalyst Cooler Duty, kJ/hr | 0 | 0 |
| | Carbon on spent - Regenerated Catalyst, wt % cat | 0.75 | 0.75 |
| | H$_2$ in Coke Burned, wt % | 6 | 6 |
| | Delta Nitrogen, wt ppm | 112 | 112 |
| Tuning Parameters | Catalytic CO Burn Factor (CO promoter) | 3.0 | 3.0 |

Embodiments of the present invention further relate to any one or more of the following paragraphs:

1. A method for regenerating coked catalyst particles, comprising heating a hydrocarbon and a coke precursor in the presence of catalyst particles to provide a cracked hydrocarbon and coked catalyst particles, wherein the coked catalyst particles include carbon deposited on at least a portion thereof; selectively separating the cracked hydrocarbon and the coked catalyst particles to provide a hydrocarbon product and coked catalyst particles; mixing the coked catalyst particles with a carrier fluid to provide a mixture; introducing the mixture to an upper surface of a dense phase catalyst zone disposed within a regenerator; introducing a gas to a lower zone of the dense phase catalyst zone; and combusting at least a portion of the carbon deposited on the coked catalyst particles to provide a flue gas, heat, and a regenerated catalyst.

2. The method according to paragraph 1, wherein the carrier fluid comprises from about 10% to about 90% of the total amount of gas introduced to the regenerator, and wherein the carrier fluid comprises from 0% to about 90% of the total amount of oxygen introduced to the regenerator.

3. The method according to paragraphs 1 or 2, wherein the carrier fluid comprises from about 20% to about 50% of the total amount of gas introduced to the regenerator, and wherein the carrier fluid comprises from about 0% to about 50% of the total amount of oxygen introduced to the regenerator.

4. The method according to paragraph 3, further comprising introducing an oxygen containing gas to the regenerator above the surface of the dense phase catalyst zone.

5. The method according to any of paragraphs 1 to 4, wherein introducing the mixture to the upper surface of the dense phase catalyst zone further comprises introducing at least a portion of the mixture to an upper portion of the dense phase catalyst zone disposed below the surface of the dense phase catalyst zone, a dilute phase catalyst zone disposed above the dense phase catalyst zone, or both.

6. The method according to any of paragraphs 1 to 5, wherein the gas comprises an oxygen-lean gas, air, or oxygen-rich gas.

7. The method according to any of paragraphs 1 to 6, wherein the carbon deposited on the spent catalyst ranges from about 0.7% wt to about 1.3% wt.

8. The method according to any of paragraphs 1 to 7, further comprising introducing a carbon monoxide combustion promoter to the regenerator.

9. A method for regenerating coked catalyst particles, comprising heating a hydrocarbon and a coke precursor in the presence of catalyst particles to provide a cracked hydrocarbon and coked catalyst particles, wherein the coked catalyst particles include carbon deposited on at least a portion thereof; selectively separating the cracked hydrocarbon and the coked catalyst particles to provide a hydrocarbon product and coked catalyst particles; mixing the coked catalyst particles with a carrier fluid to provide a mixture; introducing the mixture to a regenerator, wherein the regenerator comprises a dense phase catalyst zone and a dilute phase catalyst zone disposed above the dense phase catalyst zone; and wherein the mixture is introduced to an upper surface of the dense phase catalyst zone; introducing a gas to a lower portion of the dense phase catalyst zone; combusting at least a portion of the carbon deposited on the coked catalyst particles to provide a flue gas, heat, and a regenerated catalyst; and recycling at least a portion of the regenerated catalyst to provide at least a portion of the catalyst particles.

10. The method according to paragraph 9, wherein introducing the mixture to the upper surface of the dense phase catalyst zone further comprises introducing at least a portion of the mixture to an upper portion of the dense phase catalyst zone disposed below the upper surface of the dense phase catalyst zone, the dilute phase catalyst zone, or both.

11. The method according to paragraphs 9 or 10, wherein the carrier fluid comprises from about 10% to about 90% of a total amount of gas introduced to the regenerator, and wherein the carrier fluid comprises from about 0% to about 90% of the total amount of oxygen introduced to the regenerator.

12. The method according to any of paragraphs 9 to 11, wherein the carrier fluid comprises less than about 50% of a total amount of gas introduced to the regenerator, and wherein the carrier fluid comprises less than about 50% of the total amount of oxygen introduced to the regenerator.

13. The method according to any of paragraphs 9 to 12, wherein the flue gas comprises less than about 150 ppm nitrogen oxides.

14. The method according to any of paragraphs 9 to 13, further comprising introducing air, an oxygen-rich gas, or a combination thereof to the dilute phase catalyst zone.

15. The method according to any of paragraphs 9 to 14, further comprising introducing a carbon monoxide combustion promoter to the regenerator.

16. A method for regenerating coked catalyst particles, comprising heating a hydrocarbon in the presence of catalyst particles to provide a cracked hydrocarbon and coked catalyst particles, wherein the coked catalyst particles include carbon deposited on at least a portion thereof; selectively separating the cracked hydrocarbon and the coked catalyst particles to provide a hydrocarbon product and coked catalyst particles; mixing the coked catalyst particles with a carrier fluid to provide a mixture; introducing the mixture to a dense phase catalyst zone disposed within a regenerator, an upper surface of the dense phase catalyst zone, a dilute phase catalyst zone disposed above the dense phase catalyst zone in the regenerator, or any combination thereof; introducing a gas to the lower zone; introducing a coke precursor to the dense phase catalyst zone, the dilute phase catalyst zone, the upper surface of the dense phase catalyst zone, the mixture, or any combination thereof; combusting at least a portion of the carbon deposited on the catalyst and at least a portion of the coke precursor to provide a flue gas, heat, and a regenerated catalyst; and recycling at least a portion of the regenerated catalyst to provide at least a portion of the catalyst particles.

17. The method according to paragraph 16, wherein the carrier fluid comprises from about 10% to about 90% of a total amount of gas introduced to the regenerator, and wherein the carrier fluid comprises from about 0% to about 90% of the total amount of oxygen introduced to the regenerator.

18. The method according to paragraphs 16 or 17, wherein the carrier fluid comprises less than about 50% of a total amount of gas introduced to the regenerator, and wherein the carrier fluid comprises less than about 50% of the total amount of oxygen introduced to the regenerator.

19. The method according to any of paragraphs 16 to 18, further comprising introducing a carbon monoxide combustion promoter to the regenerator.

20. The method according to any of paragraphs 16 to 19, wherein the carbon deposited on the coked catalyst particles ranges from about 0.05% wt to about 0.3% wt.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for regenerating coked catalyst particles, comprising:
   heating a hydrocarbon and a coke precursor in the presence of catalyst particles to provide a cracked hydrocarbon and coked catalyst particles, wherein the coked catalyst particles include carbon deposited on at least a portion thereof;
   selectively separating the cracked hydrocarbon and the coked catalyst particles to provide a hydrocarbon product and coked catalyst particles;
   mixing the coked catalyst particles with a carrier fluid to provide a mixture;
   introducing the mixture to a dilute phase catalyst zone disposed within a regenerator;
   distributing the mixture of the dilute phase catalyst zone onto an upper surface of a dense phase catalyst zone disposed within the regenerator;
   introducing a gas to a lower zone of the dense phase catalyst zone; and
   combusting at least a portion of the carbon deposited on the coked catalyst particles to provide a flue gas, heat, and a regenerated catalyst.

2. The method of claim 1, wherein the carrier fluid comprises from about 10% to about 90% of the total amount of gas introduced to the regenerator, and wherein the carrier fluid comprises from about 5% to about 90% of the total amount of oxygen introduced to the regenerator.

3. The method of claim 1, wherein the carrier fluid comprises from about 20% to about 50% of the total amount of gas introduced to the regenerator, and wherein the carrier fluid comprises from about 5% to about 50% of the total amount of oxygen introduced to the regenerator.

4. The method of claim 3, further comprising introducing an oxygen containing gas to the regenerator above the upper surface of the dense phase catalyst zone.

5. The method of claim 1, further comprising distributing the mixture above the upper surface of the dense phase catalyst zone.

6. The method of claim 1, wherein the gas comprises an oxygen-lean gas, air, or oxygen-rich gas.

7. The method of claim 1, wherein the carbon deposited on the spent catalyst ranges from about 0.7% wt to about 1.3% wt.

8. The method of claim 1, further comprising introducing a carbon monoxide combustion promoter to the regenerator.

9. A method for regenerating coked catalyst particles, comprising:
   heating a hydrocarbon and a coke precursor in the presence of catalyst particles to provide a cracked hydrocarbon and coked catalyst particles, wherein the coked catalyst particles include carbon deposited on at least a portion thereof;
   selectively separating the cracked hydrocarbon and the coked catalyst particles to provide a hydrocarbon product and coked catalyst particles;
   mixing the coked catalyst particles with a carrier fluid to provide a mixture;
   introducing the mixture to a dilute phase catalyst zone disposed above a dense phase catalyst zone in a regenerator;
   distributing the mixture of the dilute phase catalyst zone onto an upper surface of the dense phase catalyst zone;

introducing a gas to a lower portion of the dense phase catalyst zone;

combusting at least a portion of the carbon deposited on the coked catalyst particles to provide a flue gas, heat, and a regenerated catalyst; and recycling at least a portion of the regenerated catalyst to provide at least a portion of the catalyst particles.

10. The method of claim 9, further comprising distributing the mixture above the upper surface of the dense phase catalyst zone.

11. The method of claim 9, wherein the carrier fluid comprises from about 10% to about 90% of a total amount of gas introduced to the regenerator, and wherein the carrier fluid comprises from about 40% to about 90% of the total amount of oxygen introduced to the regenerator.

12. The method of claim 9, wherein the carrier fluid comprises from about 10% to about 50% of a total amount of gas introduced to the regenerator, and wherein the carrier fluid comprises from about 20% to about 50% of the total amount of oxygen introduced to the regenerator.

13. The method of claim 9, wherein the flue gas comprises less than about 150 ppm nitrogen oxides.

14. The method of claim 9, further comprising introducing air, an oxygen-rich gas, or a combination thereof to the dilute phase catalyst zone.

15. The method of claim 9, further comprising introducing a carbon monoxide combustion promoter to the regenerator.

16. A method for regenerating coked catalyst particles, comprising:

heating a hydrocarbon in the presence of catalyst particles to provide a cracked hydrocarbon and coked catalyst particles, wherein the coked catalyst particles include carbon deposited on at least a portion thereof;

selectively separating the cracked hydrocarbon and the coked catalyst particles to provide a hydrocarbon product and coked catalyst particles;

mixing the coked catalyst particles with a carrier fluid to provide a mixture;

introducing the mixture to a dilute phase catalyst zone disposed above a dense phase catalyst zone in the regenerator, wherein the carrier fluid comprises from 5% to about 90% of the total amount of oxygen introduced to the regenerator;

distributing the mixture of the dilute phase catalyst zone onto an upper surface of the dense phase catalyst zone;

introducing a gas to a lower zone of the dense phase catalyst zone;

introducing a coke precursor to the dense phase catalyst zone, the dilute phase catalyst zone, the upper surface of the dense phase catalyst zone, the mixture, or any combination thereof;

combusting at least a portion of the carbon deposited on the catalyst and at least a portion of the coke precursor to provide a flue gas, heat, and a regenerated catalyst; and recycling at least a portion of the regenerated catalyst to provide at least a portion of the catalyst particles.

17. The method of claim 16, wherein the carrier fluid comprises from about 10% to about 90% of a total amount of gas introduced to the regenerator, and wherein the carrier fluid comprises from about 60% to about 90% of the total amount of oxygen introduced to the regenerator.

18. The method of claim 16, wherein the carrier fluid comprises from about 10% to about 50% of a total amount of gas introduced to the regenerator, and wherein the carrier fluid comprises from about 30% to about 50% of the total amount of oxygen introduced to the regenerator.

19. The method of claim 16, further comprising introducing a carbon monoxide combustion promoter to the regenerator.

20. The method of claim 16, wherein the carbon deposited on the coked catalyst particles ranges from about 0.05% wt to about 0.3% wt.

21. The method of claim 1, wherein the carrier fluid comprises air, oxygen-rich gas, ozone, or any combination thereof.

22. The method of claim 1, wherein a total amount of gas introduced to the regenerator is from a low of about 80% to a high of about 115% of the stoichiometric oxygen required to oxidize a total amount of coke and carbon monoxide present within the regenerator.

23. The method of claim 1, wherein the flue gas comprises less than about 40 ppm nitrogen oxides.

24. The method of claim 1, wherein the flue gas comprises less than about 0.1 mol % carbon monoxide.

25. The method of claim 16, further comprising distributing the mixture above the upper surface of the dense phase catalyst zone.

26. The method of claim 16, wherein the dilute phase catalyst zone has a catalyst concentration from about 50 $kg/m^3$ to about 160 $kg/m^3$.

27. The method of claim 1, wherein the carrier fluid comprises from about 10% to about 90% of the total amount of gas introduced to the regenerator, and wherein the carrier fluid comprises from about 40% to about 90% of the total amount of oxygen introduced to the regenerator.

28. The method of claim 9, wherein the carrier fluid comprises from about 10% to about 90% of the total amount of gas introduced to the regenerator, and wherein the carrier fluid comprises from about 60% to about 90% of the total amount of oxygen introduced to the regenerator.

29. The method of claim 16, wherein a total amount of gas introduced to the regenerator comprises from about 90% to about 105% of the stoichiometric oxygen required to oxidize a total amount of coke and carbon monoxide present within the regenerator.

* * * * *